May 1, 1962 A. M. NELSON ETAL 3,032,750
CARD PROCESSING SYSTEM

Filed Dec. 1, 1955 6 Sheets-Sheet 1

INVENTORS
ALFRED M. NELSON,
JEROME B. WIENER,
BY
Ellsworth R. Roston
ATTORNEY

INVENTORS
ALFRED M. NELSON,
JEROME B. WIENER,
BY Ellsworth R. Roston
ATTORNEY

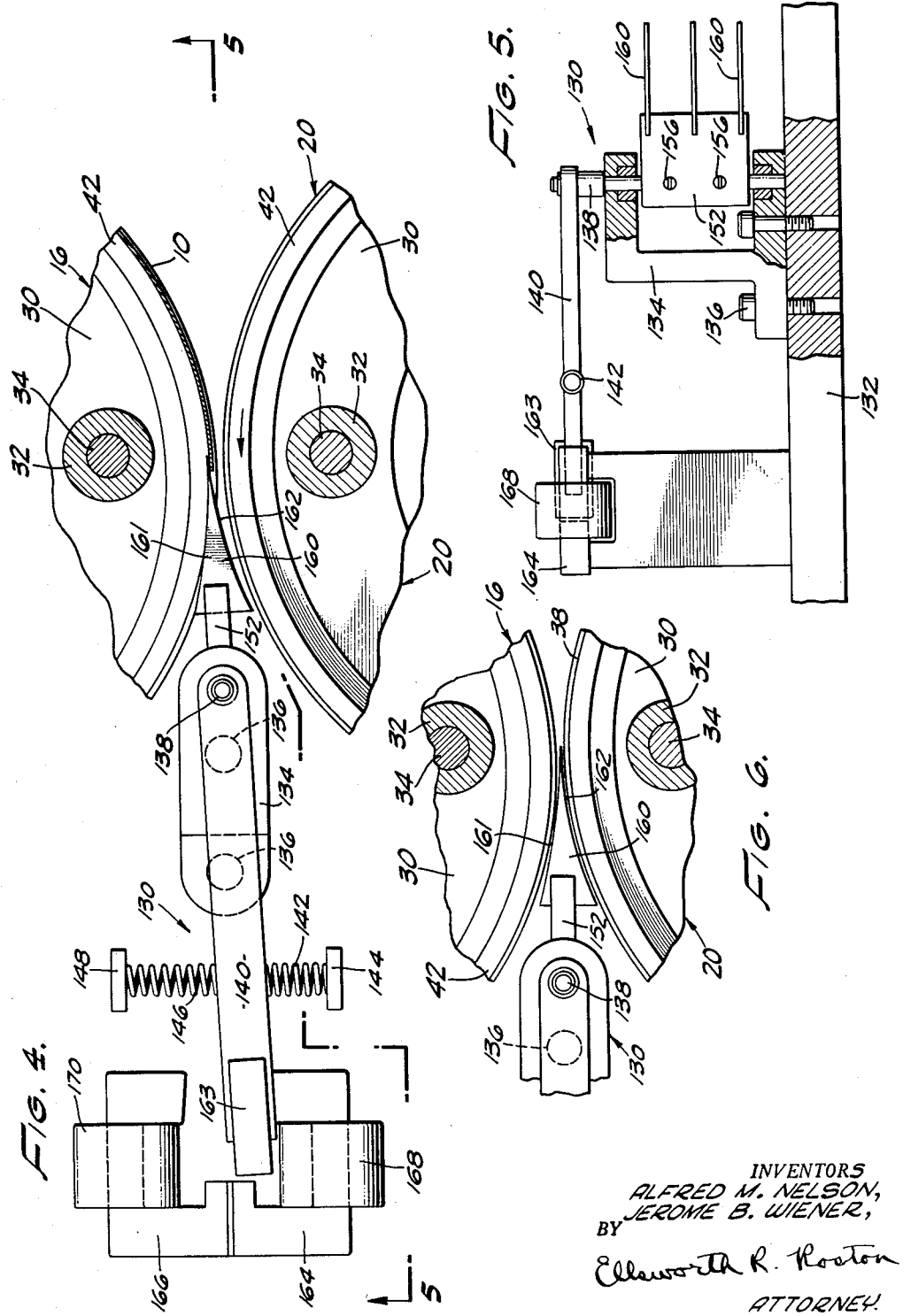

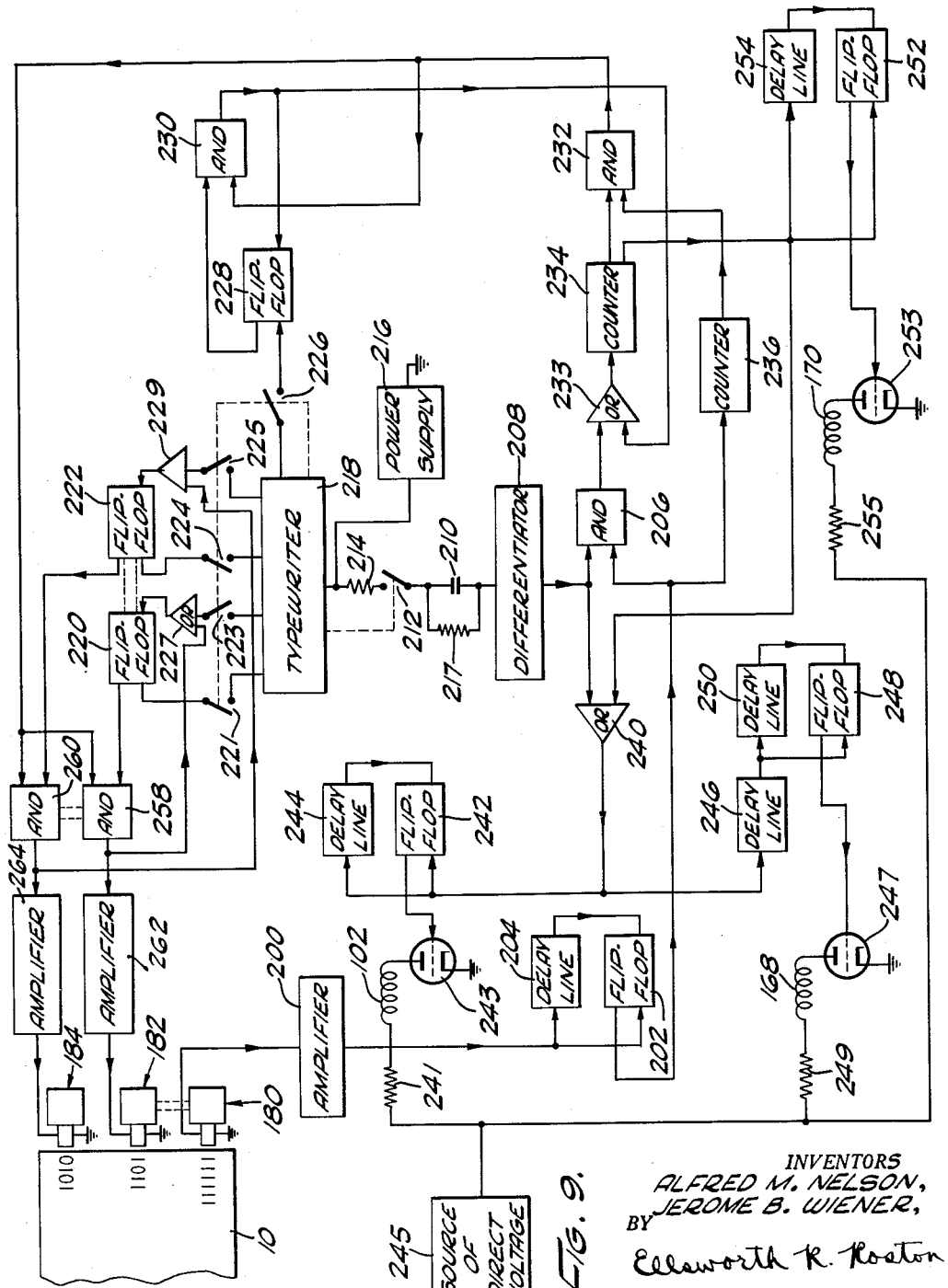

May 1, 1962 A. M. NELSON ETAL 3,032,750
CARD PROCESSING SYSTEM
Filed Dec. 1, 1955 6 Sheets-Sheet 5

INVENTORS
ALFRED M. NELSON,
JEROME B. WIENER,
BY
Ellsworth R. Roston
ATTORNEY

United States Patent Office 3,032,750
Patented May 1, 1962

3,032,750
CARD PROCESSING SYSTEM
Alfred M. Nelson, Redondo Beach, and Jerome B. Wiener, Granada Hills, Calif., assignors to The Magnavox Company, Los Angeles, Calif., a corporation of Delaware
Filed Dec. 1, 1955, Ser. No. 550,296
36 Claims. (Cl. 340—174.1)

This invention relates to apparatus for processing a plurality of information cards and more particularly to apparatus for recording information on the cards. The invention is especially related to apparatus for programming information on a plurality of cards and to apparatus for duplicating on certain cards information previously recorded on other cards. The invention also relates to a new head structure for reading and recording magnetic information on a plurality of cards.

A large number of computers and data processing systems have been built in recent years to use digital techniques for solving complex mathematical and business problems. For example, data processing systems have been built to receive, assimilate and store information relating to such complex operations as department stores and banks. In department stores, the data processing systems have been used to record sales and the prices of such sales so that a running record of inventory for a wide variety of items and the profitability of such sales can be maintained.

In one type of data processing system, the digital information relating to the different items is stored in a plurality of cards. Since there may be as many as millions of bits of information in a complex data processing system, hundreds of thousands of cards sometimes have had to be used. Because of the large number of cards, problems relating to the transducement of information have often arisen. For example, problems have arisen as to the programming of information into the different positions of a card. Problems have also arisen as to the duplication of information from one card to other cards. Such duplication is often required in a complex data processing system so that the information can be stored under different categories common to that information. Attempts have been made to provide proper transcribing and duplicating systems but such attempts have not as yet been entirely successful.

This invention provides apparatus for overcoming the above disadvantages. One embodiment of the invention operates to receive a card and to record information at successive positions in the card in accordance with the information programmed into the card automatically or by an operator. When information is recorded in one position the embodiment operates to activate the next position on the card so that information can be programmed into that position automatically or by an operator. After the information has been programmed into all of the positions of the card, the card is fed to an output stack and a new card is introduced to the embodiment so that information can be programmed into this new card.

The invention also includes an embodiment for duplicating on first cards digital information previously recorded in a second card. The information recorded on the second card can be duplicated in any desired number of the first cards in accordance with coded information programmed into the embodiment. Each of the first cards is introduced to the output stack after the information has been properly duplicated on the card. After the information has been duplicated on the desired number of first cards, the second card is advanced to an output stack and a new card is automatically introduced to the embodiment so that the information on this card can be duplicated in the above manner.

The invention also includes a new type of transducing head. In this type of head, the cards on the drum are removed from the drum at the time that the digital information on the cards is being recorded or read by the transducing head. After the digital information has been recorded or read, the cards are returned to the drum for subsequent movement on the drum. By removing the cards from the drum at the time that digital information is being read or recorded, problems relating to eccentricities in the drum are eliminated. In this way, errors cannot occur as in previous systems as a result of variations in the distance between the cards and the transducing heads.

In the drawings:

FIGURE 4 is an enlarged fragmentary sectional view substantially on the line 4—4 of FIGURE 3 and shows in further detail the construction and relative disposition of a pivotable gate and a pair of drums included in the embodiment shown in FIGURE 1 when the gate has been pivoted into one of its operative positions.

FIGURE 5 is a fragmentary sectional view substantially on the line 5—5 of FIGURE 4 and illustrates in further detail the construction of the pivotable gate shown in FIGURE 4.

FIGURE 6 is a fragmentary view similar to that shown in FIGURE 4 and illustrates the disposition of the gate relative to the associated drums in the neutral position of the gate.

FIGURE 9 is a diagram, partly in block form, somewhat schematically illustrating certain electrical circuitry for controlling the operation of the apparatus shown in the previous figures to obtain the recording of information at successive positions on cards in accordance with the information programmed into the cards automatically or by an operator.

Figure 1:
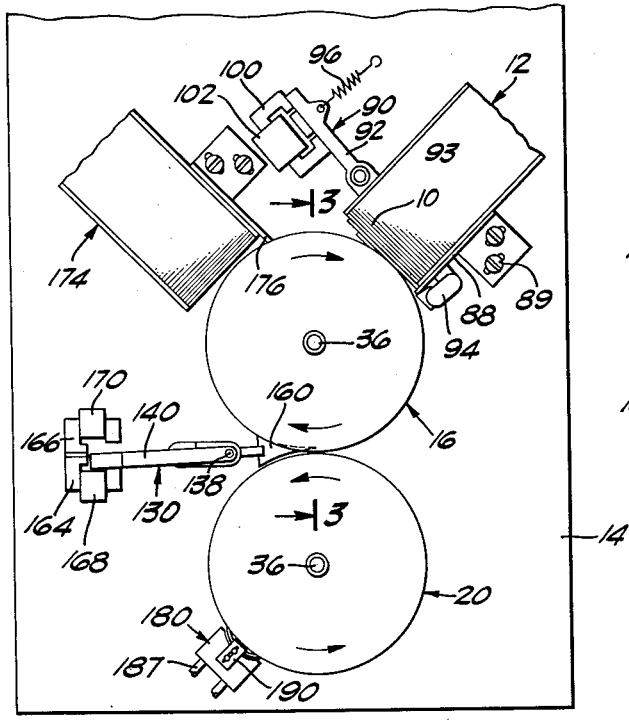
FIGURE 1 is a top plan view schematically illustrating apparatus forming one embodiment of this invention, such apparatus being adapted to record digital information on a card in accordance with an automatic programming or the programming of an operator.

In the embodiment of the invention shown in the drawings, a plurality of cards 10 (FIGURE 1) are disposed in a stack 12. The bottom edge of each card is adapted to rest on a flat surface such as the top of a table 14. The faces of each card are disposed in a substantially vertical plane extending in a somewhat lateral direction along the top of the table 14.

As shown in FIGURE 9, each card 10 is provided with a plurality of bits of information. Each bit of information by itself or in combination with other bits represents information in digital form. This information may relate to numbers, alphabetical letters, combinations of numbers and letters (alpha-numeric coding) or any other pertinent matter. The bits of information may be disposed in rows each of which extends in a direction substantially parallel to the top of the table 14. Because of the different angle at which one of the cards 10 is shown in FIGURE 9, the rows are shown as extending horizontally in that figure.

The bits of information may be provided in any suitable form on the card 10. For example, the information may be represented by holes or the absence of holes at the different positions. Preferably, the information is represented in magnetic form. In this form, magnetic fluxes of one polarity at a position may represent an indication of "0" or a "false" state and magnetic fluxes of an opposite polarity at a position may represent an indication of "1" or a "true" state.

Either one face of each card 10 may be magnetically polarized in the different information positions to represent various bits of binary information or both faces may be magnetically polarized in this manner. By polarizing both faces of each card 10, the number of cards required to store a particular amount of information can be substantially halved. The information on one side of the card will not interfere with the information on the other side of the card if the card is sufficiently thick.

Figure 3:
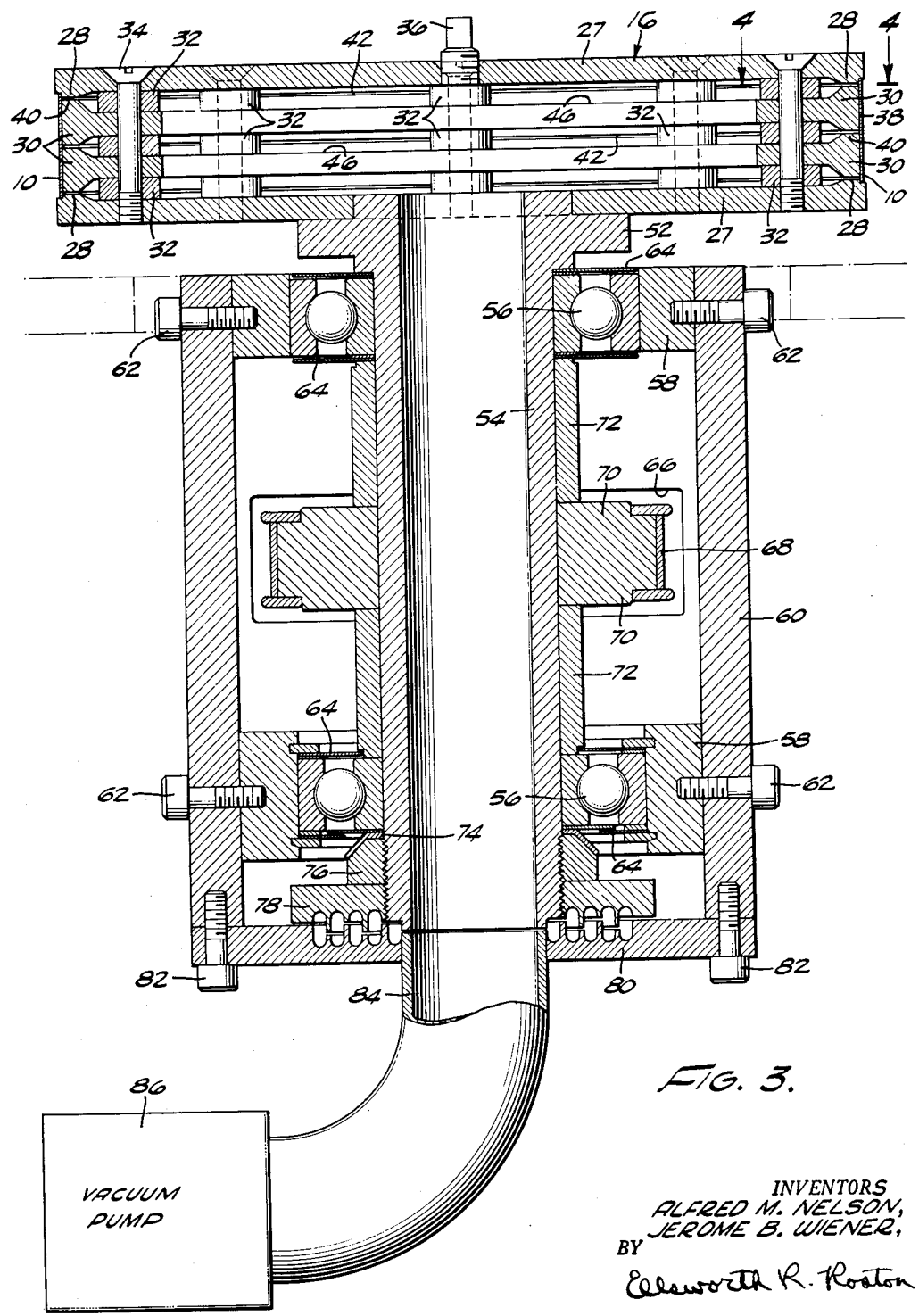
FIGURE 3 is an enlarged sectional view substantially on the line 3—3 of FIGURE 1 and illustrates in further detail the construction of one of the drums forming a part of the embodiment shown in FIGURE 1.

A drum 16 (FIGURE 1) is disposed in contiguous relationship to the input stack 12 such that it is able to withdraw cards from the stack for movement on the drum. The drum 16 is shown as rotating in a clockwise direction in FIGURE 1. A drum 20 is disposed in contiguous relationship to the drum 16 at a position removed from the input stack 12 in the direction of rotation of the drum 16. The drum 20 is adapted to rotate in an opposite direction to the drum 16 such as in a counterclockwise direction in FIGURE 1. The drums 16 and 20 are provided with similar constructions. For this reason, the construction of the drum 16 is shown in detail in FIGURE 3 and will be described fully subsequently. It is believed that the description relating to the drum 16 should indicate the construction of the drum 20.

The drum 16 includes a pair of exterior plates 27 (FIGURE 3) defining a housing and having inwardly disposed lip portions 28 at their peripheries. A second pair of plates 30 are disposed within the compartment defined by the plates 27 and are suitably disposed in spaced relationship to the plates 27 as by spacers 32 mounted on studs 34. The studs 34 extend through the plates 27 and 30 at positions near the peripheries of the plates to maintain the plates in fixed position relative to one another. A plug 36 also extends into a threaded socket in the upper plate 27 at the annular center of the plate.

The radius of the plates 30 is slightly less than that of the plates 27 by a distance corresponding substantially to the thickness of the cards 10 so as to form a neck portion 38 relative to the periphery of the plates 27. Each of the plates 30 has annular flange portions 40 extending axially from both faces of the plate 30 at the periphery of the plate. The flange portions 40 are so formed as to produce slots 42 between the plates 30 and between the flanges on the plates 30 and the lip portions 28 on the plates 27. The slots 42 communicate with auction passageways 46 formed between adjacent plates by the inclusion of the spacers 32.

The drum 20 is disposed against an annular collar 52 provided at one end of a hollow shaft 54. Bearings 56 are provided at opposite ends of the shaft 54. The inner races of the bearings 56 are mounted on the shaft and the outer races of the bearings are disposed against bushings 58 secured to a housing 60 as by studs 62. Seals 64 are disposed at opposite ends of the bearings to prevent the leakage of lubricating fluid from the bearings.

A hole 66 is provided in the housing 60 at a position between the bearings 56. The hole 66 is provided so that a belt 68 can extend into the housing and around a pulley 70. The pulley 70 is suitably positioned within the housing 60 as by sleeves 72 mounted on the shaft 54 between the bearings 56. In this way, the shaft 54 can be rotated by a suitable motor (not shown).

The bearings 56 and the sleeve 72 are maintained in fixed position on the shaft 54 as by a lock washer 74 and a nut 76. The nut 76 is adapted to be screwed on a threaded portion at the bottom of the shaft 54. A sealing disk 78 is also adapted to be screwed on the threaded portion of the shaft 54. The sealing disk 78 operates in conjunction with a bottom plate 80 to prevent movement of air between the interior of the housing 60 and the interior of the hollow shaft 54 upon a difference in pressure between the housing and the shaft.

The plate 80 is secured to the housing 60 as by studs 82. A hollow conduit 84 is in turn disposed by a push-fit within the plate 80. In this way, air can be exhausted from the hollow interiors of the shaft 54 and the conduit 84 as by a vacuum pump 86. Although the pump 86 is shown in block form in FIGURE 3, it should be appreciated that any suitable type of pump can be used.

The drum 16 is disposed in frictional relationship with the cards 10 at one end of the stack 12 such as the left end in FIGURE 1. This frictional relationship may be obtained at least in part by the vacuum produced on the periphery of the drum 16. A throat member 88 is disposed in contiguous relationship to the periphery of the drum 16. The throat member 88 is disposed at a position near the stack 12 but angularly removed from the stack in the direction of rotation of the drum. When the drum 16 rotates in a clockwise direction as shown in FIGURE 1, the throat member 88 is displaced in a clockwise direction from the stack 12. The throat member 88 is adjustably positioned relative to the periphery of the drum as by elongated slots and screws 89 extending through the slots into the table 14.

A gate generally indicated at 90 is disposed in pivotable relationship to the drum 16 to control the movements of the cards 10 on the drum past the throat member 88. The gate 90 includes a bar 92 pivotable on a pin 93 to a position overhanging the throat member 88. The bar 92 carries at one end a support member 94 which in turn carries fingers 95 adapted to fit within the slots 42 in the associated drum 16. The fingers 95 may be similar to those shown in FIGURE 2 and hereinafter to be described in detail. The bar 92 is normally disposed in a position providing a coupled relationship between the fingers 95 and the slots 42 in the drum 16.

The disposition of the fingers 95 in the slots 42 is obtained by the operation of a spring 96 disposed at the end of the bar removed from the throat member. As will be described in detail subsequently, the bar 92 carries an armature 98 disposed in magnetic proximity to a magnet 100. The magnet 100 is adapted to be energized by a coil 102 suitably wound on the magnet so as to pivot the bar 92 in a direction opposite to the action of the spring 96 on the bar.

A gate generally indicated at 130 in FIGURES 4, 5 and 6 is disposed in contiguous relationship to the drums 20 and 16. The gate 130 is disposed relative to the drum 20 at a position removed from the gate 90 in the direction of rotation of the drum. Since the drum 20 is shown in FIGURE 1 as rotating in a clockwise direction, the gate 130 is displaced in this direction from the gate 90. The gate 130 is pivotable into three different positions in a manner which will be described in detail subsequently.

As shown in FIGURES 4, 5 and 6, the gate 130 includes a base 132 (FIGURE 5) which supports a C-shaped brace 134 as by threaded studs 136. A pivot pin 138 extends through a rod 140 and through the horizontal legs of the brace 134. A first spring 142 is supported between the rod 140 and a fixed wall such as that indicated at 144 in FIGURE 4. Similarly, a second spring 146 is supported between the rod 140 and a fixed wall 148. The springs 142 and 146 are disposed on opposite sides of the rod 140 so that one of the springs will be subjected to tension by a lateral movement of the rod 140 at the same time that the other spring is subjected to a compressional force.

A post 152 is fixedly positioned on the pivot pin 138 as by studs 156 which screw into the post to press against the pin. At its outer end, the post 152 supports fingers 160 which taper inwardly as they extend from the post. The fingers 160 taper as at 161 on one side and as at 162 on the opposite side, preferably on a symmetrical basis. In this way, the fingers 160 may be disposed to provide in one pivotable position a coupling from the drum 16 to the drum 20 in a manner similar to that shown in FIGURE 4. In a second pivotal position, the fingers 160 may be disposed to provide a coupling from the drum 20 to the drum 16. This will be described in detail subsequently.

The rod 140 carries at its left end an armature 163. The armature 163 is positioned in magnetic proximity to a magnet 164 to obtain a pivotal movement of the rod 140 in a counterclockwise direction when the magnet is energized. In like manner, the armature 163 is positioned in magnetic proximity to a magnet 166 to produce a pivotal movement of the rod 140 in a clockwise direction when the magnet is energized. The magnets 164 and 166 are respectively adapted to be energised by coils 168 and 170 suitably wound on the magnets.

An output stack 174 (FIGURE 1) is positioned in contiguous relationship to the periphery of the drum 16 in a clockwise direction along the drum with respect to the disposition of the input stack 12 and the pivotable gate 130. A stop 176 is also associated with the drum 16 and the output stack 174 in abutting relationship to the drum to prevent the movement of cards on the drum past the stop. The stop 176 is slightly removed from the stack 174 in a clockwise direction corresponding to the direction of movement of the drum 16. Although only one output stack and associated components are shown, it should be appreciated that more than one output stack can also be used.

Figure 7:
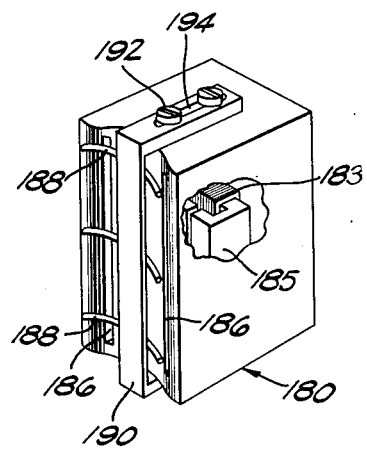
FIGURE 7 is an enlarged perspective view of an improved transducing head for reading or recording magnetic signals on information cards transferred to the drums from the input stack, certain of the members being partially broken away to show other members in some detail.
Figure 8:
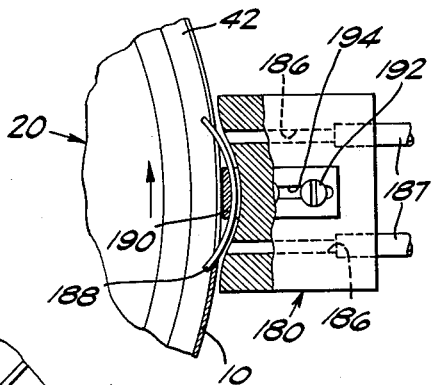
FIGURE 8 is an enlarged fragmentary top plan view of the drum and the head shown in FIGURE 7, certain parts being broken away to show other parts in further detail on a sectional basis.

As shown in FIGURES 1 and 9, a plurality of transducing members are disposed in contiguous relationship to the drum 20. Three transducing members are shown in FIGURES 1 and 9 and are generally indicated at 180, 182 and 184. However, it should be appreciated that any number of transducing members can be used in accordance with the number of different horizontal rows of information on the cards 10. Each of the transducing members 180, 182 and 184 may be constructed in a similar manner. For this reason, the construction of only the transducing member 180 is shown in detail in FIGURES 7 and 8.

The transducing member 180 is provided with magnetic means such as a coil 183 and a yoke 185. The yoke 185 may be made from a suitable magnetic material such as a soft ferromagnetic material having properties of producing considerable flux upon the flow of current through the coil 183 and of returning to a substantially neutral magnetic state upon the interruption of current through the coil. The coil 183 and the yoke 185 may be constructed in a manner similar to that presently used in transducing heads.

The head 180 is provided with vacuum passageways 186 extending through the head. The vacuum passageways 186 are adapted to be coupled to the vacuum pump 86 as by conduits 187 so that air can be withdrawn through the passageways. Pawls 188 are disposed in contiguous relationship to the passageways 186. The pawls 188 are positioned at their extremities within the slots 42 of the drum 20 and are curved from these extreme positions in a direction toward the head 180. The pawls 188 extend at an intermediate position in back of the vertical leg of a C-shaped bracket 190. The bracket 190 is suitably attached to the head 180 as by screws 192 extending into the head through an elongated slot 194 in the horizontal legs of the bracket 190. The slot 194 is sufficiently elongated so that the bracket 190 and the pawls 188 supported by the bracket can be adjustably positioned relative to the drum 20.

Certain members such as the coil 102, the coil 168 and the coil 170 and the heads 180, 182 and 184 are included in the electrical circuitry shown in FIGURE 9. The output signals from the transducing member such as the heads 180 are introduced to an input terminal of an amplifier 200. The output terminal of the amplifier 200 is connected to an input terminal of a flip-flop 202 and to an input terminal of a delay line 204. The flip-flop 202 may be constructed in a manner similar to that described on pages 164 to 166, inclusive of volume 19 entitled "Wave Forms" of the Radiation Laboratory Series, published in 1949 by the Massachusetts Institute of Technology.

The flip-flop 202 may be provided with two input terminals designated for convenience as the left and right input terminals. The output signal from the amplifier 200 is shown as being introduced to the left input terminal of the flip-flop 202. The right input terminal of the flip-flop 202 is shown as receiving the output signals from the delay line 204. The delay line 204 is adapted to provide a delay equal to substantially one-half of the time required for adjacent vertical columns on each card 10 to move past the heads such as the heads 180, 182 and 184.

The voltage on the left output terminal of the flip-flop 202 is introduced to an input terminal of an "and" network 206 having another input terminal connected to the output terminal of a differentiator 208. A connection is made from the input terminal of the differentiating network 208 to one plate of a capacitance 210, the other plate of which has a common connection with the movable contact of a single-pole, single-throw switch 212. The stationary contact of the switch 212 has voltage applied to it through a resistance 214 from a suitable source 216 of direct voltage. A resistance 217 may be connected across the capacitance 210 to provide a discharge path for any charge accumulating in the capacitance.

The movable contact of the switch 212 is ganged to a programming apparatus indicated in block form at 218. For example, the programming apparatus 218 is shown in FIGURE 9 as being a typewriter but it should be appreciated that other apparatus such as a "flexowriter" manufactured by the Commercial Controls Company of Rochester, New York, may also be used. When the typewriter 218 is used as the programming apparatus, the movable contact of the switch 212 is ganged to a particular one of the keys in the typewriter so as to close the switch when the key becomes depressed. This key may be any convenient key in the typewriter such as the one indicating an asterisk (*). The coupling between a particular key in the typewriter 218 and the switch 212 is indicated by broken lines in FIGURE 9.

A plurality of flip-flops are associated with the typewriter 218. A pair of flip-flops 220 and 222 are shown as being associated with the typewriter but it should be appreciated that more than two flip-flops may be used. This is indicated by broken lines extending between the flip-flops 220 and 222. Connections are shown as being made from the typewriter 218 to the left and right input terminals of the associated flip-flops such as the flip-flops 220 and 222, through single-pole switches 221, 223, 224 and 225. These connections are intended to indicate the passage of signals in various patterns to the input terminals of the flip-flops in the plurality such as the flip-flops 220 and 222 when different typewriter keys are depressed.

For example, when the letter "A" in the typewriter 218 is depressed, the switches 221 and 224 may become closed for the simultaneous passage of signals to the left input terminals of the flip-flops 220 and 222. Upon a depression of the letter "B" the switches 221 and 225 may become actuated into closure so that signals may be simultaneously introduced to the left input terminal of the flip-flop 220 and the right input terminal of the flip-flop 222. Signals may be introduced to the input terminals of the flip-flops such as the flip-flops 220 and 222 in distinctive patterns when various other keys in the typewriter 218 are depressed. The signals respectively pass to the right input terminals of the flip-flops such as the flip-flops 220 and 222 through "or" networks such as "or" networks 227 and 229.

The movable contact of a switch 226 is ganged to all of the keys except the key such as the asterisk (*) key controlling the actuation of the switch 212. The movable contact of the switch 226 is associated with these keys so as to close the switch during the time that any one or more of the keys is depressed. This is indicated by broken lines extending through all of the switches 221, 223, 224, 225 and 226. The movable contact of the switch 226 is shown in FIGURE 9 as being connected to the typewriter 218 and the stationary contact of the switch is shown as being connected to the left input terminal of a flip-flop 228. These connections are intended to represent schematically that a signal passes from the typewriter 218 or associated apparatus to the left input terminal of the flip-flop 228 when the switch 226 is depressed by the actuation of one or more keys in the typewriter other than the particular key such as the asterisk (*) key.

The left output terminal of the flip-flop 228 has a common connection with an input terminal of an "and" network 230, another input terminal of which is connected to the output terminal of "and" networks 232. The output signals from the "and" network 230 pass through an "or" network 233 to an input terminal of a counter 234. The signals from the "and" network 206 are also introduced through the "or" network 233 to the counter 234. The "and" networks such as the "and" networks 206 and 230 may be constructed in a manner similar to that disclosed on page 32 of "Arithmetic Operations in Digital Computers" by R. K. Richards (published by D. Van Nostrand Company, Inc., of Princeton, New Jersey, in February 1955). The counter 234 in FIGURE 9 may be formed from a plurality of flip-flops connected in a cascade arrangement in a conventional manner. In such an arrangement, each flip-flop is adapted to be triggered by a signal from the preceding flip-flop every time that the preceding flip-flop is triggered from one particular state of operation to the other.

The "and" networks 232 may be constructed in a manner similar to that disclosed in Edwards Patent 2,615,127 or Woolard Patent 2,641,696. By way of illustration, Woolard Patent 2,641,696 discloses circuitry responsive to a first plurality of flip-flops 24 and a second plurality of flip-flops 27 for indicating the relative values of two numbers stored in the flip-flaps of the first and second pluralities. The flip-flops 24 in Woolard may correspond to the flip-flops in the counter 234 and the flip-flops 27 may correspond to the flip-flops in the counter 236 of applicants' invention. An output of zero potential is produced on line 5 in FIGURES 1 and 3 of the Woolard patent when the numbers introduced to the flip-flops 24 and 27 have equal values. An output different from zero potential is produced on the line 5 in FIGURES 1 and 3 of the Woolard patent when the numbers introduced to the flip-flops 24 and 27 in Woolard are not equal.

Connections are made from output terminals of the counter 234 to an input terminal of the "and" networks 232. These connections are represented by a single line extending from the counter to the "and" network. In like manner, the output terminal of a counter 236 has a common connection with a second input terminal of the "and" networks 232. The counter 236 may be formed from a plurality of flip-flops connected in a cascade arrangement in a manner similar to that described above for the counter 234. The counter 236 is adapted to receive at an input terminal the signals produced on the plate of the left tube in the flip-flop 202.

In addition to the connection made from the counter 234 to the "and" networks 232, the counter has an output terminal connected to one input terminal of an "or" network 240. Another input terminal of the "or" network 240 receives the signals from the differentiator 208. The output signals from the "or" network 240 pass to the left input terminal of a flip-flop 242. The output signals from the "or" network 240 are also introduced to the input terminal of a delay line 244 having its output terminal connected to the right input terminal of the flip-flop 242.

The signals produced on the left output terminal of the flip-flop 242 are applied to the grid a tube 243. The grid of the tube 243 may be biased in a suitable manner with a negative potential (not shown) to maintain the tube normally non-conductive. The cathode of the tube 243 may be grounded. The coil 102 (also shown in FIGURES 1 and 2) and a resistance 241, are in series between the plate of the tube 243 and the positive terminal of a suitable source 245 of direct voltage.

The signals passing through the "or" network 240 are applied to a delay line 246 as well as to the delay line 244 and the flip-flop 242. After passing through the delay line 246, the signals are introduced to the left input terminal of a flip-flop 248 and to the input terminal of a delay line 250 having its output terminal connected to the right input terminal of the flip-flop 248.

The signals produced on the left output terminal of the flip-flop 248 are introduced to the grid of a tube 247 corresponding to the tube 243. The grid of the tube 247 may be negatively biased to maintain the tube normally non-conductive and the cathode of the tube is grounded. The coil 168 (also shown in FIGURES 4 and 5) and a resistance 249 are in series between the plate of the tube 247 and the positive terminal of the voltage source 245.

As previously described, the coil 168 is associated with the coil 170 in the pivotable gate 130. The coil 170 is adapted to be energized by signals produced on the left output terminal of a flip-flop 252.

These signals are introduced to the grid of a tube 253, which may be normally non-conductive by a negative bias applied to the grid of the tube. The cathode of the tube 253 is grounded. The coil 170 and a resistance 255 are in series between the plate of the tube 253 and the positive terminal of the voltage source 245.

Connections are made to the left input terminal of the flip-flop 252 from the same output terminal of the counter 234 as is connected to the "or" network 240. This output terminal of the counter 234 is also connected to the input terminal of a delay line 254 having its output terminal connected to the right input terminal of the flip-flop 252.

In addition to being connected to the input terminal of the "and" network 230, the output terminal of the "and" network 232 has common connections with input terminals of "and" networks 258 and 260. Other input terminals of the "and" networks 258 and 260 respectively receive the signals produced on the left output terminals of the flip-flops 220 and 222. The output signals from the "and" networks 258 and 260 are respectively introduced to input terminals of the "or" networks 227 and 229. The signals from the "and" networks 258 and 260 are also respectively introduced to the heads 182 and 184 to control the recording of magnetic information by the heads on the card 10. Amplifiers 262 and 264 may be included to produce a gain in the signals from the "and" networks 258 and 260 before the signals are respectively introduced to the heads 182 and 184.

Since the drums 16 and 20 are constructed in a similar manner as described above, they also operate in a similar manner, and for this reason the operation of the drum 20 should be understood from a description of the operation of the drum 16. Since the drum 16 is coupled to the shaft 54 (FIGURE 3), it rotates with the shaft when the shaft is driven by the belt 68. The housing 60 remains stationary as the shaft 54 rotates because of the operation of the bearings 56 and the conduit 84 also remains stationary since it is push-fit into the plate 80 defining the bottom of the housing.

Even though the shaft 54 is rotating relative to the conduit 84, the vacuum pump 86 is able to withdraw air through the continuous passage formed by the shaft in the conduit. This results from the operation of the disk 78 and the plate 80 in producing a seal in the junction between the shaft 54 and the conduit 84. The vacuum created by the pump 86 causes air to be withdrawn from the drum 16 through the passageways 46 and the hollow contours of the shaft 54 and the conduit 84.

Since the slots 42 communicate with the passageways 46, an inward force is created on the periphery of the drum 16 upon the operation of the vacuum pump 86. The vacuum force produced on the periphery of the drum 16 is instrumental in maintaining the cards 10 in fixed position on the periphery of the drum as the drum rotates. In like manner, the cards 10 are maintained in fixed position as the periphery of the drum 20 during the rotation of the drum once they have been transferred to the drum.

Figure 2:
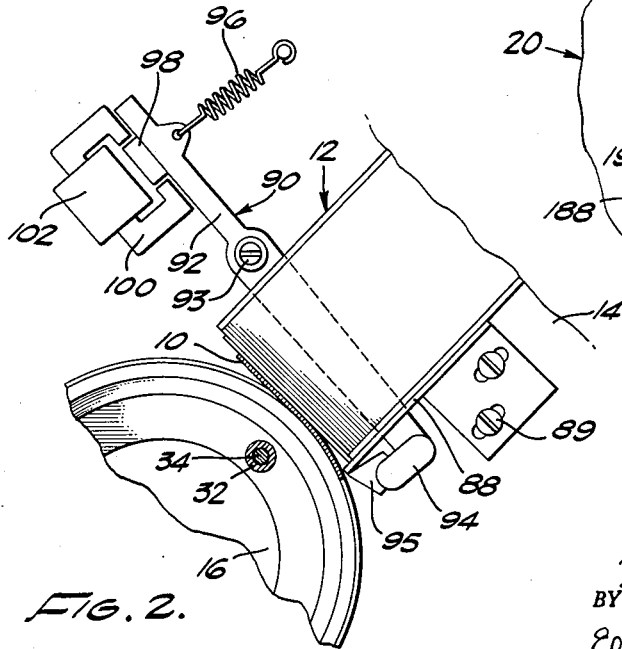
FIGURE 2 is an enlarged fragmentary top plan view somewhat schematically illustrating the construction and relative disposition of a drum, a pivotable gate and an input stack shown in FIGURE 1 when the gate is pivoted into a position for obtaining a transfer of a card from the input stack to the drum.

In the normal positioning of the gate 90 (FIGURES 1 and 2) the fingers 95 fit within the slots 42 of the drum 16 to prevent any cards 10 from moving on the drum past the bar. Since the fingers 95 are positioned relatively close to the stack 12, the fingers actually operate in their normal position to prevent any card from leaving the stack 12. As best seen in FIGURE 2, the fingers 95 are moved out of the slots 42 in the drum 16 when the coil 102 is energized by the logical circuitry shown in FIGURE 9. The fingers 95 are moved out of the slots 42 in the drum 16 by the operation of the magnet 100 on the armature 98 when the coil 102 is energized. This causes the armature 98 to be attracted toward the magnet 100 and the bar 92 to be pivoted in a counterclockwise direction against the action of the spring 96. A pivotal movement of the bar 92 in a counterclockwise direction causes the bar to move away from the periphery of the drum 16 so that the cards 10 from the stack 12 can move on the drum 16 past the fingers 95.

When the bar 92 is pivoted in a counterclockwise direction, the drum 16 presses against the card 10 at the right end of the stack 12 and moves the card with it toward the throat member 88. The drum 16 can be made to remove only one of the cards 10 from the stack 12 at any one time by adjusting the spacing between the throat member 88 and the periphery of the drum 16. Upon the removal of each card 10 from the stack 12, the card 10 becomes positioned on the periphery of the drum 16 at the neck portion 38 (FIGURE 6) of the drum. This helps to hold each card 10 in position on the periphery of the drum 16 as the drum rotates.

The cards transferred from the stack 12 to the drum 16 remain on the drum during the drum rotation until the cards reach the position at which the drum 16 and 20 are contiguous. The cards then become transferred to the drum 20 because of the disposition of the gate 130 in the positioning shown in FIGURE 4. This will be described in detail subsequently in connection with the circuitry shown in FIGURE 9. In the positioning of the gate 130 shown in FIGURE 4, the fingers 160 extend into the slots 42 to a position radially interior to the cards 10 traveling on the periphery of the drum 20. By disposing the fingers 160 radially interior to the periphery of the drum 20 in a manner similar to that shown in FIGURE 4, the fingers block the movement of the cards 10 on the periphery of the drum so that the cards are forced to move along the fingers.

Because of the disposition of the fingers 160 relative to the drums 16 and 20, the cards 10 leave the drum 16 at the forward end of the fingers and travel along the fingers to the periphery of the drum 20. This results from the tapered configuration of the fingers 160 as at 162 in FIGURE 4 and also results from the disposition of the fingers in contiguous relationship to the drum 20 at a position laterally near the post 152.

When the cards reach the drum 20, the vacuum force produced at the periphery of the drum serves to hold the cards in fixed position on the periphery of the drum as the drum rotates. The cards 10 cannot be lost during the process of transfer between the drums 16 and 20 since at least a portion of each card is forced by pressure against the periphery of one of the drums during the process of transfer. For example, the trailing portion of each card is pressed against the drum 16 at the beginning of the card movement along the fingers 160 of the gate 130. Subsequently, the end portions of each card are disposed on the peripheries of the drums 16 and 20 while the middle portion is moving along the tapered edges of the fingers 160. In the final stages of transfer from the drum 16 to the drum 20, the leading portion of each card 10 is pressed against the periphery of the drum 20 by the vacuum force exerted on the drum.

In a second position of the gate 130, the fingers 160 are disposed at their forward end in contiguous relationship to the periphery of the drum 20. In this position, the fingers 160 extend into the slots 42 of the drum 20 to a position radially interior to the cards 10 traveling on the periphery of the drum. Because of this disposition, the cards traveling on the drum 20 cannot move on the drum past the fingers 160. Since the fingers 160 are tapered at their top end as at 161 in FIGURES 4 and 6, in a manner similar to the taper 162 provided for the fingers at their bottom end, the fingers obtain a transfer of the cards 10 from the drum 20 to the drum 16 in the second position of the fingers.

At particular times, the gate 130 is pivoted to a neutral position from its positions coupling the drums 16 and 20. The gate is pivoted to its neutral position when no current flows through either of the coils 168 and 170 in FIGURE 4. In the neutral positioning of the gate 130, the fingers 160 are disposed out of contact with the slots 42 in each of the drums 16 and 20. Since the fingers 160 are no longer positioned within the slots 42 of either of the drums 16 or 20, the cards 10 in each drum are able to rotate with the drum past the fingers. This may be seen from the relative disposition of the fingers 160 and the drums 16 and 20 in FIGURE 6. Upon the movement of a card 10 on the drum 20 past the gate 130, the card contains its circulation on the drum through another revolution.

The gates 90 and 130 are pivoted in accordance with the operation of the circuitry shown in FIGURE 9. The circuitry shown in FIGURE 9 is in turn controlled by the signal information moving past the head 180 and by the operation of the typewriter 218. Initially, the first card 10 in the stack 12 is prevented by the gate 90 from being withdrawn by the drum 16. This results from the fact that the fingers 95 in the gate 90 are disposed within the slots 42 of the drum to prevent any movement of cards on the periphery of the drum.

Upon the depression of a particular key in the typewriter 218, such as the asterisk key (*), the switch 212 becomes closed. This causes a transient surge of current to flow through a circuit including the voltage source 216, the resistance 214, the switch 212, the capacitance 210 and the differentiator 208. This surge of current causes a signal to be produced by the differentiator 208 for introduction through the "or" network 240 to the left input terminal of the flip-flop 242. This signal triggers the flip-flop 242 for the production of a relatively high voltage on the left output terminal of the flip-flop.

When a relatively high voltage is produced on the left output terminal of the flip-flop 242, it causes the tube 243 to become conductive. Because of this, current flows through a circuit including the voltage source 245, the resistance 241, the coil 102 and the tube 243. The coil 102 becomes energized by the flow of current through it and acts through the magnet 100 (FIGURES 1 and 2) upon the armature 98 to pivot the bar 92 in a direction away from the slots 42 in the drum 16. Since the fingers 95 are no longer positioned to impede the movement of a card 10 on the periphery of the drum 16, the drum is able to act by friction to withdraw the first card 10 from the stack 12. After being withdrawn from the stack 12 by the drum 16, the card 10 is maintained in fixed position on the periphery of the drum during the drum rotation because of the vacuum force exerted through the slots 42 on the periphery of the drum.

The signal passing through the "or" network 240 to the left input terminal of the flip-flop 242 is also introduced to the delay line 244. This signal is subsequently introduced after a sufficient delay to the right input terminal of the flip-flop 242. The signal triggers the flip-flop 242 so that a relatively high voltage is produced on the right output terminal of the flip-flop and a relatively low voltage is produced on the left terminal of the flip-flop. The low voltage on the left output terminal of the flip-flop 242 cuts off the tube 243 and prevents current from flowing through the coil 102. Because of the interruption of the current through the coil 102, the action of the spring 96 in FIGURES 1 and 2 becomes predominant. This causes the bar 92 to pivot in a direction for returning the fingers 95 to a position within the slots 42 of the drum 16. In this way, only the first card 10 in the stack 12 can be withdrawn by the drum 16 from the stack.

The signal passing through the "or" network 240 is also introduced to the delay line 246. The line 246 operates to delay the signal for a sufficient time for the card 10 to travel on the drum 16 to a position approaching the pivotable gate 130. The signal then passes through the delay line 246 to the left input terminal of the flip-flop 248. The signal triggers the flip-flop so that a relatively high voltage is produced on the left output terminal of the flip-flop. The high voltage on the left output terminal of the flip-flop 248 is introduced to the grid of the tube 247 to make the tube conductive. This causes current to flow through a circuit including the voltage source 245, the resistance 249, the coil 168 and the tube 247. The current energizes the coil 168 which causes the gate 130 to be pivoted in a direction for obtaining a transfer of the card 10 from the drum 16 to the drum 20. This is the position of the gate 130 shown in FIGURE 4.

The gate 130 remains in the position shown in FIGURE 4 for a sufficient time for the card 10 to be transferred from the drum 16 to the drum 20. After such a period of time, a signal passes through the delay line 250 to the right input terminal of the flip-flop 248. This signal triggers the flip-flop to the "false" state of the flip-flop. In the "false" state of the flip-flop 248, a relatively high voltage is produced on the right output terminal of the flip-flop and a relatively low voltage is produced on the left output terminal of the flip-flop. The low voltage on the left output terminal of the flip-flop 248 is introduced to the grid of the tube 247 to cut off the tube and prevent the coil 168 from being energized. Since the coil 168 is no longer energized, the gate 130 returns to the neutral position shown in FIGURE 6, so that the card 10 transferred to the drum 20 is able to circulate on the drum.

The signal from the differentiator 208 also passes to the "and" network 206. The signal passes through the "and" network upon the occurrence of the next clock signal from the head 180. The production of the clock signals will be described in detail subsequently. After passing through the "and" network 206, the signal from the differentiator 206 passes through the "or" network 233 to the counter 234 and triggers the flip-flops in the counter to advance the count by one integer. Since a count of zero is initially in the counter 234, the signal passing through the "or" network 233 advances the indications in the counter 234 to a representation of the decimal value "1" in binary form.

As has been previously described, the bits of binary information on the card 10 are disposed in a plurality of horizontal rows. One of the horizontal rows such as the bottom row of the card 10 in FIGURE 9 may have a binary indication of "1" in each position. By providing a binary indication of "1" in each position, a count is obtained as to the number of vertical columns passing by the heads such as the heads 180, 182 and 184. In this way, each vertical column on a card 10 can be distinguished from every other vertical column on the card.

The head 180 reads the indications of "1" in the successive positions on the bottom horizontal row of the card 10. These indications are amplified and inverted by the amplifier 200 and are introduced as negative signals to the left input terminal of the flip-flop 202. Each signal from the amplifier 200 triggers the flip-flop 202 to produce a relatively high voltage on the left output terminal of the flip-flop.

At an intermediate time from the introduction of each pulse position to the introduction of the next position in the bottom horizontal row of the card 10, the negative signal from the amplifier 200 passes through the delay line 204. This signal then passes to the right input terminal of the flip-flop 202 and triggers the flip-flop to produce a relatively high voltage on the right output terminal of the flip-flop. In this way, the flip-flop 202 is prepared for triggering by the passage of each signal from the amplifier 200 to the left input terminal of the flip-flop. The flip-flop 202 is in effect triggered to its true state by clock signals produced by the amplifier 200 and the delay line 204 in each pulse position in the bottom horizontal row of the card 10.

Each of the clock signals produced on the left output terminal of the flip-flop 202 passes to the counter 236 to advance the count by one integer. In this way, the counter 236 provides an indication in binary form at any instant of the number of vertical columns which have moved in each card 10 past the heads 180, 182 and 184. When all of the positions on a card 10 have moved past the heads 180, 182 and 184, a full count is produced in the counter 236. This causes a new count to be initiated in the counter when the card 10 circulating on the drum 20 starts to move past the heads 180, 182 and 184 through another revolution or when the next card from the stack 12 starts to move past the heads 180, 182 and 184.

The card 10 transferred to the drum 20 from the stack 12 continues to circulate on the drum without any recording of information on the card until one of the keys in the typewriter 218 is depressed. When one of the keys in the typewriter 218 is depressed, it causes the flip-flops such as the flip-flops 220 and 222 to be triggerd into a pattern of operation dependent upon the particular key depressed. For example, the switches 221 and 224 may become closed and the flip-flops 220 and 222 may be triggered to their true states when the "A" key is depressed. In like manner, the switches 221 and 225 may become closed. This causes the flip-flop 220 to be triggered to its true state and the flip-flop 222 to be triggered to its false state upon an actuation of the "B" key. The signals on the left output terminals of the flip-flops 220 and 222 are respectively introduced to the "and" networks 258 and 260 to indicate the pattern of operation of the flip-flops.

The switch 226 also closes when one of the typewriter keys such as the "A" key or the "B" key is actuated. This causes a signal to be introduced to the left input terminal of the flip-flop 228 to trigger the flip-flop into its true state for the production of a relatively high voltage on the left output terminal of the flip-flop. This high voltage is introduced to the "and" network 230 to prepare the "and" network for the passage of a signal. Upon becoming prepared for the passage of a signal, the "and" network 230 passes a signal when a high voltage is introduced to it from the "and" networks 232. This occurs when relatively high voltages are simultaneously introduced to the "and" networks 232 from the counters 234 and 236.

As previously described, the counter 234 is set to an indication of "one" when the card 10 first passes from the drum 16 to the drum 20. In every revolution of the drum 20, the counter 236 also provides an indication of "1" in binary form when the first vertical column on the card 10 passes by the heads 180, 182 and 184. Because of this, a signal passes through the "and" networks 232 to the "and" network 230 in every revolution of the drum 20 when the first position on the card 10 moves past the heads 180, 182 and 184. However, the signal from the "and" networks 232 cannot pass through the "and" network 230 until a high voltage is introduced to the "and" network 230 from the flip-flop 228 by the depression of one of the keys on the typewriter 218 other than the particular key such as the "asterisk" (*) key.

The signal passing through the "and" network 230 is introduced through the "or" network 233 to the counter 234. This signal triggers the counter 234 to advance the indications in the counter by one integer. In this way, the counter 234 now provides an indication of the decimal value "2" in binary form. This indication causes a signal to pass through the "and" networks 232 in each revolution of the drum 20 when the second column on the card 10 moves past the heads 180, 182 and 184.

As previously described, the signal passes through the "and" networks 232 in each revolution of the drum 20 at the first position of the card 10 during the time that the counter 234 is set to an indication of the decimal value "1" in binary form. The signal passing through the "and" networks 232 is introduced to the "and" networks 258 and 260 to prepare the "and" networks for activation. When the "and" networks 258 and 260 become prepared for activation, signals pass through the "and" networks upon the production of relatively high voltages on the left output terminals of the flip-flops 220 and 222. As previously described, this can occur only when one of the keys on the typewriter 218 such as the "A" key is depressed. The signals passing through the "and" networks 258 and 260 are recorded on the card 10 by the heads 182 and 184. In this way, signals are recorded in the first position of the card 10 in accordance with coded information representing the particular typewriter key which is actuated.

The signals passing through the "and" networks 258 and 260 are also respectively introduced through the "or" networks 227 and 229 to the right input terminals of the flip-flops 220 and 222. These signals trigger the flip-flops 220 and 222 to their false states. In this way, no further information can pass through the "and" networks 258 and 260 to the heads 182 and 184 until another typewriter key is depressed. This prevents information from being recorded on the card 10 in any position following the first position until a typewriter key is again depressed.

When a key in the typewriter is depressed, information is recorded by the heads 182 and 184 in the first vertical column of the card 10 in a coded pattern representing the particular key depressed. At the same time, the counter 234 is triggered so that its indications advance by an integer to represent a decimal value of "2" in binary form. The counter 234 is triggered by a signal passing through the "and" network 230 and the "or" network 233 in a manner similar to that described above. In this way, information can be recorded on the card 10 in successive vertical columns in accordance with the actuation of the various keys in the typewriter 218.

The indications in the counter 234 advance by an integer every time that information is recorded by the heads 182 and 184 in a particular vertical column of the card 10. When the last position on the card is presented for the recording of information, the counter 234 has a full count. This causes the indications in the counter 234 to change from a full count to a value of zero when information is recorded in the last vertical column of the card circulating on the drum 20.

Upon a change of the indications in the counter 234 from a full count to a value of zero, a signal passes from the counter 234 to the left input terminal of the flip-flop 252. This signal triggers the flip-flop 252 so that a relatively high voltage is produced on the left output terminal of the flip-flop. The relatively high voltage produced on the left output terminal of the flip-flop 252 causes the tube 253 to become conductive and current to flow through a circuit including the voltage source 245, the resistance 255, the coil 170 and the tube 253.

When current flows through the coil 170, the coil acts upon the armature 163 (FIGURES 4 and 5) so as to produce a pivotal movement of the gate 130 (FIGURES 4, 5 and 6) in a direction for obtaining a transfer of the card 10 from the drum 20 to the drum 16. The card then continues on the drum until it reaches the stop 176 in FIGURE 1. The stop 176 acts to prevent a further movement of the card on the drum 16, such that the card becomes transferred to the output stack 174.

The coil 170 remains energized for a sufficient period of time for the card 10 to become transferred from the drum 20 to drum 16. After the transfer of the card 10 has been completed, the signal from the counter 234 passes through the delay line 254 to the right input terminal of the flip-flop 252. The signal triggers the flip-flop 252 to its false state for the production of a relatively high voltage on the right output terminal of the flip-flop and a relatively low voltage on the left output terminal of the flip-flop. The low voltage on the left output terminal of the flip-flop 252 is introduced to the grid of the tube 253 to cut off the tube. This prevents the coil 170 from being further energized and causes the gate 130 to be returned to the neutral state so that the card 10 transferred from the drum 20 to the drum 16 continues to move with the drum 16 toward the stop 176 for transfer into the stack 174.

The signal from the counter 234 also passes through the "or" network 240 to the left input terminal of the flip-flop 242. The signal triggers the flip-flop 242 to produce a relatively high voltage on the left output terminal of the flip-flop. This high voltage makes the tube 243 conductive so as to obtain a flow of current through a circuit including the voltage source 245, the resistance 241, the coil 102 and the tube 243. The coil 102 becomes energized by the flow of current and acts through the magnet 100 (FIGURES 1 and 2) on the armature 98 to produce a movement of the bar 92 out of the slots 42 in the drum 16. Upon such an occurrence, the drum 16 acts by friction to remove the next card 10 from the input stack 12 for movement on the drum.

After the next card 10 has been removed by the drum 16 from the input stack 12, the signal from the counter 234 passes through the delay line 244 to the right input terminal of the flip-flop 242. This signal triggers the flip-flop 242 to its false state. The resultant relatively low voltage on the left output of the tube causes the tube 243 to become cut off and prevents the coil 102 from being further energized. By deenergizing the coil 102, the spring 96 (FIGURES 1 and 2) is able to pivot the bar 92 in a direction to move the fingers 95 within the slots 42 in the drum 16. This prevents any further cards 10 from being removed by the drum 16 from the input stack 12.

The signal passing through the "or" network 240 from the counter 234 is not only introduced through the "or" network 240 to the left input terminal of the flip-flop 242 but is also introduced to the delay line 246. The line 246 delays the signal for a time sufficient for the card just transferred to the drum 16 to move along the drum to the gate 130. At the time that the card 10 is reaching the gate 130, the signal passes through the delay line 246 and triggers the flip-flop 248 to its true state. The resultant relatively high voltage on the left output terminal of the flip-flop 248 makes the tube 247 conductive. This causes current to flow through a circuit including the voltage source 245, the resistance 249, the coil 168 and the tube 247. The coil becomes energized by this flow of current and acts upon the gate 130 to pivot the gate into a position for obtaining a transfer of the card from the drum 16 to the drum 20.

After the card 10 has been transferred from the drum 16 to the drum 20, a signal passes through the delay line 250 to the right input terminal of the flip-flop 248. The signal triggers the flip-flop 248 to produce a relatively high voltage on the right output terminal of the flip-flop and a relatively low voltage on the left output terminal of the flip-flop. The low voltage produced on the left output terminal of the flip-flop 248 cuts off the tube 247 and prevents the coil 168 from being further energized. This causes the gate 130 to move to its neutral position in which the card transferred to the drum 20 is able to circulate on the drum through a plurality of revolutions.

When the second card from the stack 10 becomes transferred to the drum 20, it circulates on the drum until information has been recorded in all of the positions on the card. Upon the completion of such a recording operation, the card becomes transferred from the drum 20 to the drum 16 and then to the output stack 174. At substantially the same time, the next card 10 is removed by the drum 16 from the input stack 12 and is transferred to the drum 20. In this way, information can be recorded on successive cards and the cards can then be transferred to the output stack 174 in the same disposition relative to their adjacent cards as their original disposition in the input stack 12. However, the cards became transferred to the stack 174 in the reverse order relative to their original disposition in the stack 12. The cards can be stacked in their original order by passing the cards through a reversing station such as is disclosed in co-pending application Serial No. 538,111, filed October 3, 1955 by Robert M. Hayes et al., now Patent No. 2,842,362, issued July 8, 1958.

In each revolution of the drum 20, the card 10 on the drum moves past the heads 180, 182 and 184. As each card reaches the pawls 188 (FIGURES 7 and 8) extending into the slots 42 in the drum 20, the card becomes lifted by the pawls from the periphery of the drum. The card 10 then moves on the pawls 188 to a position approaching the heads 180, 182 and 184. Because of the curved configuration of the pawls, the card becomes positioned in contiguous relationship to the heads 180, 182 and 184 during its movement along the pawls 188. The card becomes positioned in contiguous relationship to the heads 180, 182 and 184 since a force is exerted through the passageways 186. This force is created by the operation of the pump 86 in producing a vacuum in the passageways 186.

Since each card 10 becomes disposed in contiguous relationship to the heads 180, 182 and 184 during the movement of the card along the pawls 188, an optimum transducing action is obtained between the card and the heads. For example, a relatively great amount of flux is able to thread the card 10 to insure the proper production of magnetic signals on the card in accordance with the introduction of electrical signals to the heads 180, 182 and 184. An optimum transducing action is obtained regardless of imperfections in the contour of the drum. These imperfections may result from drum eccentricities which produce variations in the drum from a true cylindrical shape. An optimum transducing action is obtained by the heads 180, 182 and 184 since the cards leave the drum 20 at the time that the transducing action is about to take place.

After the transducing action has been performed, the card 10 traveling on the pawls 188 again approaches the drum 20. This results from the curvature of the pawls 188 in a direction approaching the drum 20 in the trailing half of the pawls. When the card 10 reaches the drum 20 it becomes fixedly positioned on the drum and remains in this fixed position during the rotation of the drum until it again reaches the pawls 188. The card 10 remains in fixed position on the drum 20 because of the vacuum force exerted on the periphery of the drum through the passageways 46 and the slots 42. In this way, an optimum transducing action is obtained between the card and the heads 180, 182 and 184, no matter how many times the card rotates with the drum 20 to reach the heads.

The above discussion has related to the transfer of information from an external source such as the typewriter 218 to the information cards transferred to the drums 16 and 20. It should be appreciated that information from the information cards can also be transferred to the external source such as the typewriter 218 for recording or for subsequent use in the performance of mathematical calculations.

It should be further appreciated that the transfer of information between the cards 10 and the external source such as the typewriter 218 does not necessarily have to occur in every position of the cards. For example, the transfer of information can be made to occur only at selected positions in accordance with the information programmed into a plurality of selectors.

The above discussion has proceeded on the basis of an automatic transfer of cards from the input stack 12 to the drums 16 and 20 and from the drums to the output stack 174. It should be appreciated, however, that the transfer can also be made manually as by the depression of a push-button on a switch. Such a manual transfer might be desirable under certain circumstances, especially when information is to be transferred between the cards and the external source only at isolated times.

The gate 130 in FIGURES 1, 4, 5 and 6 has been described as being a three-positioned member in which one of the positions represents a neutral state such as is shown in FIGURE 6. Actually, the neutral state may not be necessary in the embodiment shown in FIGURES 1 to 9, inclusive. The reason is that the cards 10 are transferred to the drum 16 and then to the drum 20 on an intermittent basis. After each card has been transferred from the drum 16 to the drum 20 by positioning the gate as shown in FIGURE 4, the gate can remain in the position shown in FIGURE 4 since the card on the drum 20 can continue to circulate on the drum in this positioning of the gate. For this reason, the gate can remain in the position shown in FIGURE 4 until the card is ready to be transferred from the drum 20 to the drum 16 and then to the output stack 174.

Figure 10:
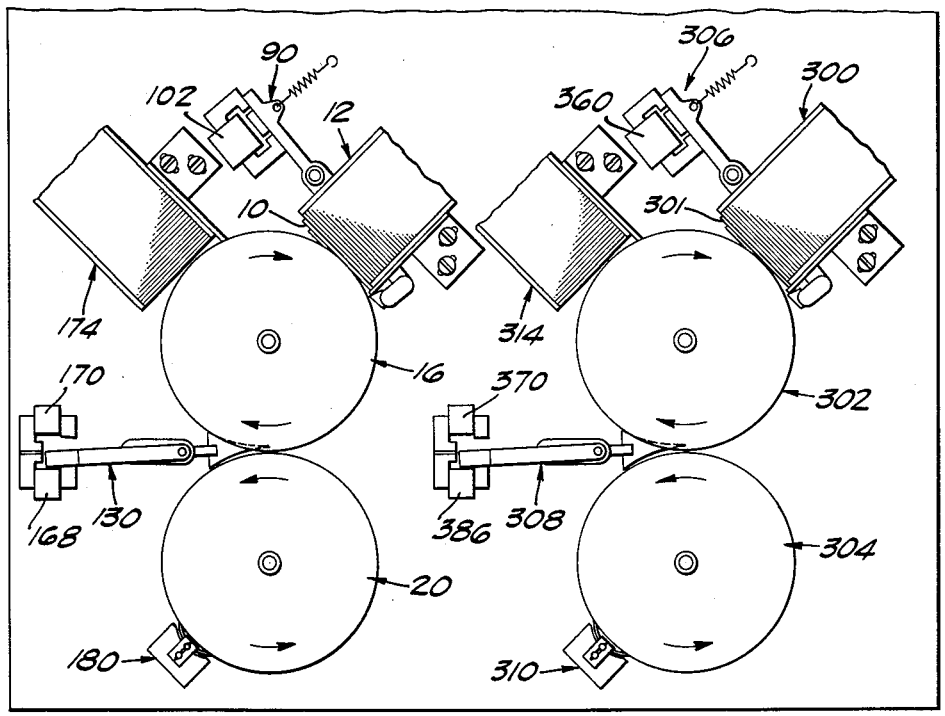
FIGURE 10 is a top plan view somewhat schematically illustrating apparatus constituting another embodiment of this invention for duplicating on first cards information previously recorded on second cards as by the apparatus shown in the previous figures.
Figure 12:
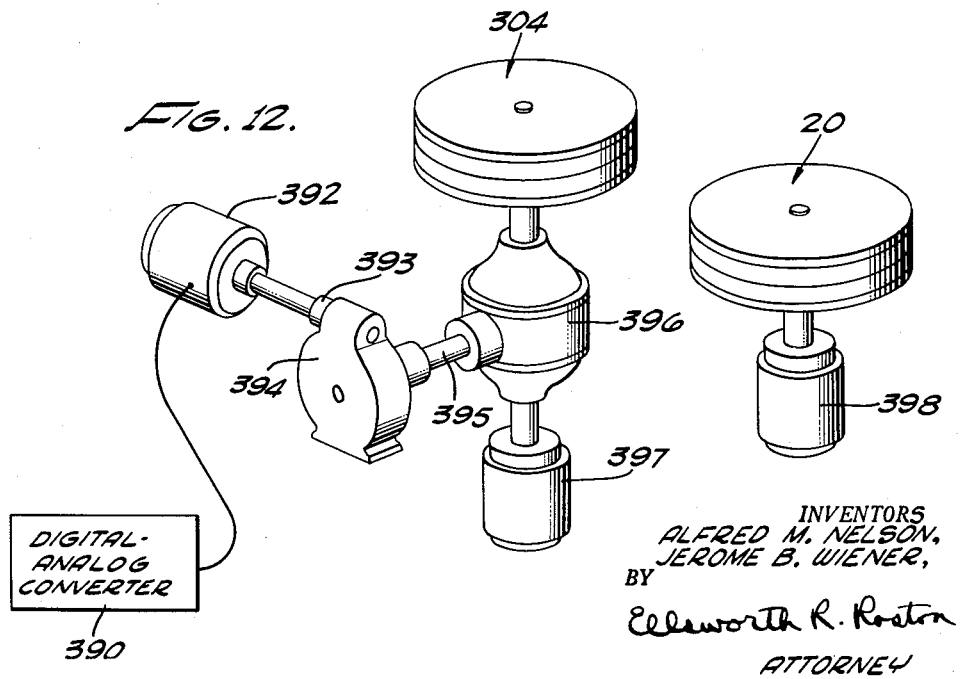
FIGURE 12 is a perspective view somewhat schematically illustrating the construction of a servo system for use with the apparatus shown in FIGURES 10 and 11.
Figure 11:
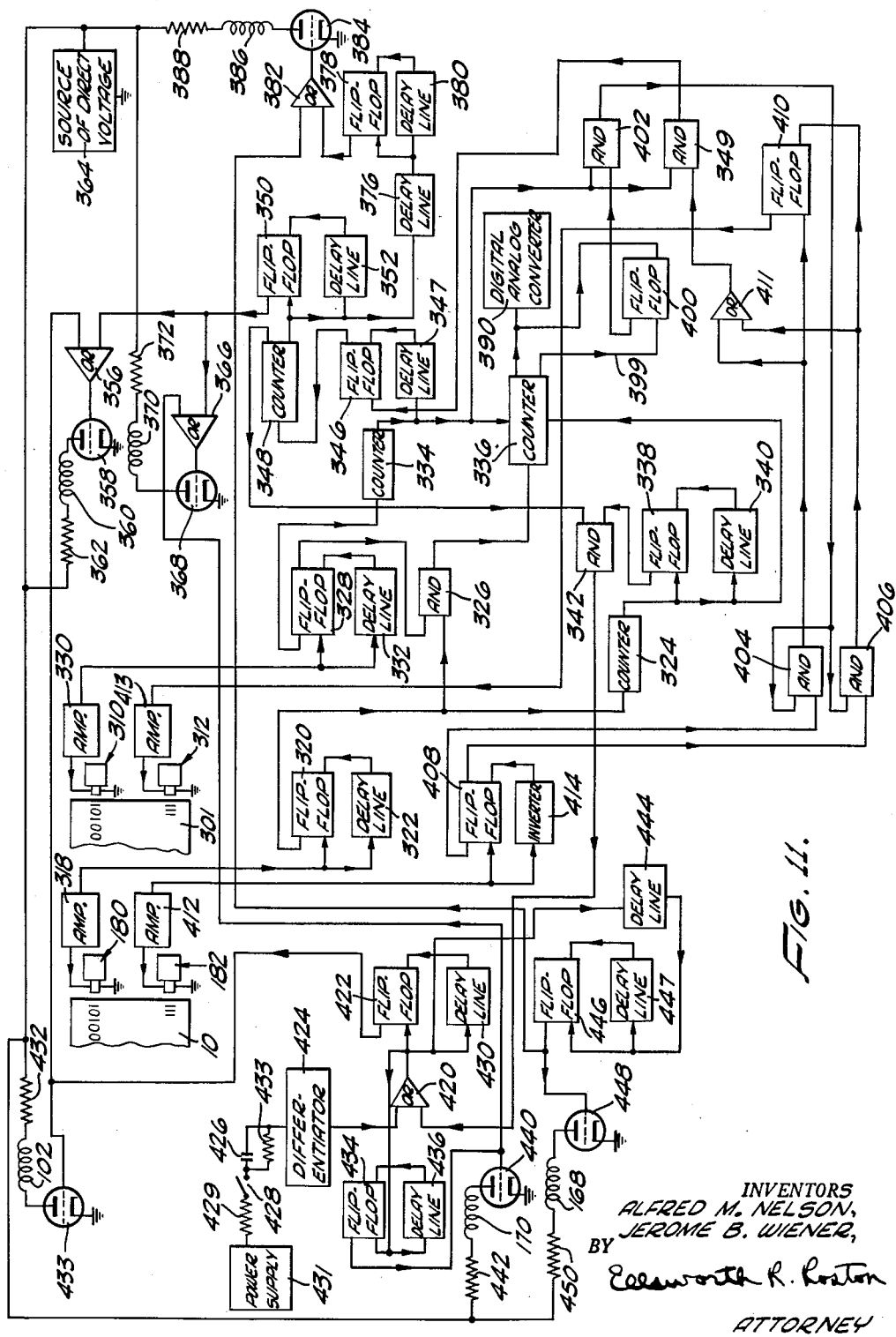
FIGURE 11 is a diagram, partly in block form, somewhat schematically illustrating certain electrical circuitry for controlling the operation of the apparatus shown in FIGURE 10.

The apparatus described above, and shown in FIGURES 1 to 9, inclusive, operates to transcribe information from a control instrument such as the typewriter 218 to one or more of the cards 10. Apparatus similar to that shown in FIGURES 1 to 8, inclusive, can be used to provide a duplication of information from a master card to one or more slave cards. The duplicating apparatus is shown in simplified form in FIGURES 10 to 12, inclusive. It includes the input stack 12, the drums 16 and 20, the gates 90 and 130, the output stack 174 and the heads, such as heads 180 and 182. The head 184 is not included in the duplicating apparatus shown in FIGURES 10 to 12, inclusive, for purposes of simplicity.

Apparatus similar to that described in the previous paragraph is also included to duplicate on slave cards 301 the information previously recorded on the master cards 10 transferred from the input stack 12 to the drums 16 and 20. This duplicating apparatus includes an input stack 300 similar to the stack 12 as well as drums 302 and 304 respectively corresponding to the drums 16 and 20. The apparatus also includes a pivotable gate 306 corresponding to the gate 90 and a pivotable gate 308 corresponding to the gate 130. Heads such as heads 310 and 312 (FIGURE 11) are disposed in contiguous relationship to the drum 304 to perform functions similar to those performed by the heads 180 and 182, respectively. An output stack 314 is (FIGURE 10) positioned in contiguous relationship to the drum 302 to receive the cards 301 circulating on the drum 304 after the information has been duplicated on the cards.

Electrical circuitry is associated with the apparatus described above to control the duplicating operation. The electrical circuitry includes an amplifier 318 (FIGURE 11) having its input terminal connected to the head 180 and its output terminal connected to the left input terminal of a flip-flop 320 and to the input terminal of a delay line 322. The output signals from the delay line 322 are introduced to the right input terminal of the flip-flop 320. Connections are made from the left output terminal of the flip-flop 320 to a counter 324 similar to the counter 236 shown in FIGURE 9 and are also made to an input terminal of an "and" network 326. Another input terminal of the "and" network 326 has a common connection with the right output terminal of a flip-flop 328.

The left input terminal of the flip-flop 328 receives through an amplifier 330 the signals induced in the head 310. The signals from the amplifier 330 also pass to the input terminal of a delay line 332 having its output terminal connected to the right input terminal of the flip-flop 328. The signals produced on the left output terminal of the flip-flop 328 are introduced to a counter 334 corresponding in construction and operation to the counter 324. The output terminal of the counter 334 has a common connection with an input terminal of a counter 336, another input terminal which is connected to the output terminal of the "and" network 326. The counter 336 may be constructed in a manner similar to the counters 324 and 334 to provide an indication in binary form of the number of signals introduced to it.

The counter 336 also has an input terminal connected to the output terminal of the counter 324. The signals from the output terminal of the counter 324 pass to the left input thermal of a flip-flop 338 and to an input terminal of a delay line 340 as well as to an input terminal of the counter 336. The output signals from the delay line 340 are introduced to the right input terminal of the flip-flop 338. The flip-flop 338 has its left output terminal connected to an input terminal of an "and" network 342, another input terminal of which is connected to an output terminal of a binary counter 348.

In addition to passing to an input terminal of the counter 336, the signals from the counter 334 pass to an input terminal of a delay line 347, having its output terminal connected to the right input terminal of a flip-flop 346. The left input terminal of the flip-flop 346 receives the signals passing through an "and" network 349.

The signals on the right output terminal of the flip-flop 346 are applied to the input terminal of a counter 348. The counter 348 has a first output terminal connected to the input terminal of the "and" network 342. The counter 348 also has a second output terminal connected to the left input terminal of a flip-flop 350 and to the input terminal of a delay line 352. The right input terminal of the flip-flop 350 receives the output signals from the delay line 352.

The signals on the left output terminal of the flip-flop 350 are introduced through an "or" network 356 to the grid of a tube 358. The grid of the tube 358 may be negatively biased to maintain the tube normally non-conductive and the cathode of the tube is grounded. A coil 360 and a resistance 362 are in series between the plate of the tube 358 and the positive terminal of a source 364 of direct voltage corresponding to the voltage source 245 in FIGURE 9. The coil 360 is included in the gate 306 to perform functions similar to those performed by the coil 102 in FIGURES 1, 2 and 9.

The signals on the left output terminal of the flip-flop 350 also pass through an "or" network 366 to the grid of a tube 368. The grid of the tube 368 may be negatively biased in a manner similar to that described above for the grid of the tube 358 and the cathode of the tube 368 is grounded. A coil 370 and a resistance 372 are in series between the plate of the tube 368 and the positive terminal of the voltage source 364. The coil 370 may be included in the gate 308 to perform functions similar to those performed by the coil 170 in the gate 130 (FIGURES 4, 5, and 6).

The signals from the counter 348 (FIGURE 11) pass to a delay line 376 as well as to the flip-flop 350 and the delay line 352. Connections are made from the output terminal of the delay line 376 to the left input terminal of a flip-flop 378 and to the input terminal of a delay line 380 having its output terminal connected to the right input terminal of the flip-flop 378. The signals on the left output terminal of the flip-flop 378 are introduced through an "or" network 382 to the grid of a tube 384. The grid of the tuge 384 may be negatively biased and the cathode of the tube is grounded. A coil 386 and a resistance 388 are in series between the plate of the tube 384 and the positive terminal of the voltage source 364. The coil 386 may be included in the gate 308 to perform functions similar to those performed by the coil 168 in the gate 130 (FIGURES 4, 5 and 6).

An output terminal of the counter 336 is connected to an input terminal of a digital-to-analog converter 390, which may be constructed in a conventional manner. The output voltage from the converter 390 is introduced to a direct current motor 392 (FIGURE 12) which is adapted to drive a worm 393 through an angular distance related to the voltage introduced to it. The worm 393 in turn drives a worm wheel 394 coupled through a shaft 395 to a differential 396. The rotation of the drum 304 is controlled in part by the operation of the differential 396. The drum 304 is primarily adapted to be driven by a synchronous motor 397 and the drum 20 is adapted to be directly driven by a synchronous motor 398.

The same output signals of the counter 336 are applied to the right input terminal of a flip-flop 400 as are applied to the converter 390. The left input terminal of the flip-flop 400 receives the signals through a line 399 from a second output terminal of the counter 336. The signals on the left output terminal of the flip-flop 400 are applied to the input terminal of an "and" network 402 having another input terminal connected to the output terminal of the counter 334.

The signals from the "and" network 402 pass to first input terminals of "and" networks 404 and 406. The second input terminals of the "and" networks 404 and 406 respectively receive the voltages on the left and right output terminals of a flip-flop 408. Connections are made from the output terminals of the "and" networks 404 and 406 to the input terminals of an "or" network 411. The output terminals of the "and" networks 404 and 406 are also respectively connected to the left and right input terminals of a flip-flop 410. The signals on the left output terminal of the flip-flop 410 are applied to the head 312. An amplifier 413 may be included to produce a gain in the signals from the flip-flop 410 before the signals are introduced to the head 312.

Signals pass to the left input terminal of the flip-flop 408 through an amplifier 412 from the head 182. The signals from the amplifier 412 also pass to the input terminal of an inverter 414 having its output terminal connected to the right input terminal of the flip-flop 408.

The output signals from the "and" network 342 are introduced through an "or" network 420 to the left input terminal of a flip-flop 422. Signals also pass to the "or" network 420 from the output terminal of a differentiator 424. The input terminal of the differentiator 424 is connected to one input terminal of a capacitance 426 having its other input terminal connected to the stationary contact of a manually operated single-pole, single-throw switch 428. The movable contact of the switch 428 has a common connection with one terminal of a resistance 429. The other terminal of the resistance 429 is connected to the positive terminal of a power supply 431. A resistance 433 may be in parallel with the capacitance 426 to receive any charge in the capacitance.

In addition to passing to the left input terminal of the flip-flop 422, the signals from the "or" network 420 pass through a suitable delay line 430 to the right input terminal of the flip-flop 422. A connection is made from the left output terminal of the flip-flop 422 to an input terminal of the "or" network 356 and to the grid of a tube 433. The grid of the tube 433 may be negatively biased to inhibit the flow of current and the cathode of the tube is grounded. The coil 102 and a resistance 432 are in series between the plate of the tube 433 and the positive terminal of the voltage source 364. The coil 102 is included in the gate 90 which is also shown in FIGURES 1 and 2.

The signals from the "or" network 420 also pass to the left input terminal of a flip-flop 434 and to the input terminal of a delay line 436 having its output terminal connected to the right input terminal of the flip-flop. The voltage on the left output terminal of the flip-flop 434 is applied to the grid of a tube 440. The grid of the tube 440 may be negatively biased to inhibit the flow of current through the tube, and the cathode of the tube is grounded. The coil 170 and a resistance 442 are in series between the plate of the tube 442 and the positive terminal of the voltage source 364. The coil 170 is included in the pivotable gate shown in FIGURES 4, 5 and 6 and described fully above.

The signals from the "or" network 420 pass to a delay line 444 as well as to input terminals of the flip-flops 422 and 434 and the delay lines 430 and 436. The output signals from the delay line 444 are applied to the left input terminal of a flip-flop 446 and to an input terminal of a delay line 447, the output terminal of which is connected to the right input terminal of the flip-flop. The grid of a tube 448 receives the voltage on the left output terminal of the flip-flop 446. The grid of the tube 448 may be negatively biased to inhibit the flow of current in the tube, and the cathode of the tube is grounded. The coil 168 and a resistance 450 are in series between the plate of the tube 448 and the positive terminal of the voltage source 364.

When the switch 428 is manually closed, a surge of current flows from the power supply 431 through the resistance 429 and the switch to charge the capacitance 426. This surge of current produces a signal which is differentiated by the differentiator 424 to produce a relatively sharp pulse. The pulse produced by the differentiator 424 passes through the "or" network 420 and triggers the flip-flop 422 to its true state, as represented by a relatively high voltage on the left output terminal of the flip-flop 422. This voltage is introduced to the grid of the tube 433 to make the tube conductive.

When the tube 433 becomes conductive, current flows through a circuit including the voltage source 364, the resistance 432, the coil 102 and the tube. The coil 102 becomes energized by the flow of current and actuates the gate 90 in FIGURE 1 to a position away from the drum 16. By pivoting the gate 90 out of cooperative relationship with the drum 16, the drum is able to withdraw the first card 10 from the stack 12.

The relatively high voltage produced on the left output terminal of the flip-flop 422 is also introduced through the "or" network 356 to the grid of the tube 358. This voltage makes the tube 358 conductive and produces a flow of current through a circuit including the voltage source 364, the resistance 362, the coil 360 and the tube 358. The coil 360 becomes energized by the flow of current and actuates the gate 306 to a position out of cooperative relationship with the drum 302 in FIGURE 11. In this way, the drum 302 is able to remove the first card 301 from the stack 300.

After the first cards have been respectively removed by the drums 16 and 302 from the stacks 12 and 306, the signal from the differentiator 424 passes through the "or" network 420 and the delay line 430 to the right input terminal of the flip-flop 422. This signal triggers the flip-flop 422 to its "false" state as represented by a relatively high voltage on the right output terminal of the flip-flop and a relatively low voltage on the left output terminal of the flip-flop. Upon the production of a relatively low voltage on the left output terminal of the flip-flop 422, the tubes 358 and 433 become cut off to interrupt the flow of current through the coils 360, and 102, respectively. Since the coils 102 and 360 are no longer energized, the gates 90 and 306 move into cooperative relationship with the drums 16 and 302 to prevent the further removal of cards from the input stacks 12 and 300 (see FIGURES 1 and 10).

During the time that the cards are traveling along the drums 16 and 302 toward the gates 130 and 308, the signal from the "or" network 420 is passing through the delay line 444. This signal reaches the left input terminal of the flip-flop 446 at the same time that the card on the drum 116 is approaching the gate 130. The signal triggers the flip-flop 446 to its true state for the production of a relatively high voltage on the left output terminal of the flip-flop. The high voltage on the left output terminal of the flip-flop 446 is introduced to the grid of the tube 448 to make the tube conductive. This causes current to flow through a circuit including the voltage source 364, the resistance 450, the coil 168 and the tube 448. Because of the flow of current through the coil 168, the gate 130 becomes actuated into position for obtaining a transfer of the master card 10 from the drum 16 to the drum 20.

The relatively high voltage produced on the left output terminal of the flip-flop 446 also passes through the "or" network 382 to the grid of the tube 384 and makes the tube conductive. Current then flows through a circuit including the voltage source 364, the resistance 388, the coil 386 and the tube 384. The coil 386 becomes energized by this flow of current and actuates the gate 308 into position for obtaining a transfer of the above card 301 from the drum 302 to the drum 304.

After the cards on the drums 16 and 302 have been respectively transferred to the drums 20 and 304, a signal passes through the delay line 447 to the right input terminal of the flip-flop 446. The signal triggers the flip-flop 446 to its "false" state as represented by a relatively high voltage on the right output terminal of the flip-flop. The resultant low voltage on the left output terminal of the flip-flop 446 causes the tubes 448 and 384 to become cut off and prevents the coils 168 and 386 from being further energized. This causes the gates 130 and 308 in FIGURE 10 to return to their neutral positions such that the cards transferred to the drums 20 and 304 continue to circulate with the drums through one or more revolutions.

As the card 10 transferred to the drum 20 from the input stack 12 moves with the drum, it passes the heads 182 and 180. As previously described, the card has an indication of "1" in each position in the top horizontal row, which is contiguous to the head 180. The amplifier 318, the flip-flop 320 and the delay line 322 operate on these successive indications of "1" on the card 10 in a manner similar to that described above to produce clock signals on the left output terminal of the flip-flop. These clock signals are introduced to the "and" network 326. The clock signals from the flip-flop 320 pass through the "and" network 326 during the time that a relatively high voltage is produced on the right output terminal of the flip-flop 328.

It may sometimes happen that the master card 10 transferred to the drum 20 may reach the heads 180 and 182 before the slave card 301 transferred to the drum 304 reaches the heads 310 and 312. During the time until the card 301 on the drum 304 reaches the heads 310 and 312, a relatively high voltage is continuously produced on the right output terminal of the flip-flop 328. This results from the fact that no clock signals are produced by the head 310 for introduction to the flip-flop 328 until the card 301 starts to move past the head. Because of this, the clock signals produced on the left output terminal of the flip-flop 320 are able to pass through the "and" network 326 until the card on the drum 304 reaches the heads 310 and 312. These signals pass through the "and" network 326 to the counter 336. The signals trigger the counter 336 so that the counter provides an indication in binary form as to the number of positions between the leading edges of the cards on the drums 20 and 304.

The digital indications produced by the counter 336 are transformed by the converter 390 into a voltage having an amplitude corresponding to the digital indications. For example, the converter 390 may produce an output potential of approximately 5 volts when the counter 336 produces a decimal value of "5" in binary form. Various types of converters may be used to obtain the proportionate voltage. The voltage produced by the converter 390 is introduced to the servo motor 392 in FIGURE 12 to produce a rotation of the motor through an angle related to the voltage. The motor 392 operates through the worm 393, the worm wheel 394 and differential 396 to drive the drum 304 through an angle related to the voltage applied to the motor. The movement imparted to the drum 304 by the motor 392 is in addition to that imparted to the drum by the synchronous motor 397. In this way, the speed of the drum 304 can be momentarily changed so that the slave card 301 on the drum can approach alignment with the master card 10 on the drum 20.

The cards 301 transferred to the drum 304 from the input stack 300 have indications of "1" in every position in the top horizontal row in a manner similar to that described above for the cards 10 in the input stack 12. Because of these indications, the amplifier 330, the flip-flop 328 and the delay line 332 operate to produce clock signals on the left output terminal of the flip-flop 328. These clock signals are introduced to the counter 334 which operates in a manner similar to that described above for the counter 236 in FIGURE 9. In this way, the counter 334 provides at any instant an indication in binary form of the number of vertical columns which have moved on the card 301 past the heads 310 and 312.

The counter 334 is constructed to provide a full count when the last position on each card 301 moves past the heads 310 and 312. This causes the counter to change from a full count to an indication in binary form of "0" at the last position on each card. At such a time, an output signal is produced in the counter 334 and is introduced to the counter 336 to reset the counter 336 to an indication of zero. By coupling the output of the counter 334 to the counter 336, the counter 336 can operate in the next revolution of the drums 20 and 304 to provide an indication as to the separation now existing between the master card 10 on the drum 20 and the slave card 301 on the drum 304.

The counter 336 can be constructed to indicate a maximum count which is considerably less than the number of positions on the cards 10 and 301. For example, the counter 336 can be constructed to count in binary form up to a decimal value of "32." This would correspond to a separation of 32 positions between the leading edges of the cards on the drums 20 and 304.

In such a situation, if a greater separation than 32 positions exists between the leading edges of the cards on the drums 20 and 304, the counter 336 would provide only an indication in binary form of the decimal value "32." A maximum indication of limited value need only be provided since only a limited correction in the positions of the cards can be obtained in each revolution of the drums 20 and 304.

After several revolutions, the separation between the leading edges of the cards on the drums 20 and 304 is sufficiently small so that the counter provides an indication of less than "32."

While the error between the positions of the cards on the drums 20 and 304 remains greater than the maximum count such as "32" provided by the counter 336, the motor 392 operates at a constant rate to reduce the error. When the error finally becomes less than the maximum value such as "32," the indications provided by the counter 336 start to represent the true error in digital form. This causes the motor 392 to operate at a reduced rate in correcting the error between the positions of the cards on the drums 20 and 304. By correcting the error at a decreasing rate, a damping action is obtained to prevent any hunting action by the motor 392.

An alignment between the card 10 on the drum 20 and the card 301 on the drum 304 is obtained in a relatively short time even though the drums may have to rotate through a plurality of revolutions and even though the error between the dispositions of the cards may be reduced at a decreasing rate. The reason is that the cards rotate at a relatively high speed.

When the card on the drum 304 becomes aligned with the card on the drum 20, no signals pass through the "and" network 326 to trigger the counter 336. This causes an indication in binary form of "0" to continue in the counter 336 even after the card 10 on the drum 20 has reached the heads 180 and 182 and the card 301 on the drum 304 has reached the heads 310 and 312. Since an indication of "0" is produced in the counter 336, a signal passes through the line 399 to the left input terminal of the flip-flop 400.

The signal passing through the line 399 from the counter 336 triggers the flip-flop 400 to its true state as represented by a relatively high voltage on the left output terminal of the flip-flop. This voltage is introduced to the "and" network 402 to prepare the "and" network for the passage of a signal. The relatively high voltage produced on the left output terminal of the flip-flop network 400 continues only while the counter 336 provides an indication of "0." The reason for this is that a triggering signal is introduced to the right input terminal of the flip-flop when the indications in the counter 336 change from a value of "0." This signal triggers the flip-flop 400 to its "false" state as represented by a relatively high voltage on the right output terminal of the flip-flop and a relatively low voltage on the left output terminal of the flip-flop.

When the "and" network 402 becomes prepared by the introduction of a relatively high voltage from the left output terminal of the flip-flop 400, a signal passes through the "and" network upon the movement past the heads 310 and 312 of the last position of the card 301 on the drum 304. A signal passes through the "and" network 402 at this time because of the conection of an input terminal of the "and" network to the output terminal of the counter 334. This signal passes to the "and" networks 404 and 406 and prepares the "and" networks for opening.

Upon the preparation of the "and" networks 404 and 406 for opening, the signals on the left and right input terminals of the flip-flop 408 respectively pass through the networks. The signals on the left and right input terminals of the flip-flop 408 respectively represent indications of "1" and "0" induced in the head 182. The signals are induced in the head 182 in accordance with information in successive positions on the card 10 in the horizontal row contiguous to the head.

The signals induced in the head 182 pass through the "and" networks 404 and 406 and trigger the flip-flop 410 into corresponding states of operation. The signals produced in the flip-flop 410 are introduced to the head 312 so that the head can record the signals in magnetic form on the slave card 301 circulating on the drum 304. In this way, the information in the master card 10 on the drum 20 can be duplicated in the slave card 301 circulating on the drum 304.

As described in the previous paragraph, signals can pass through the "and" networks 404 and 406 only when signal information is being transferred from the master card 10 on the drum 20 to the slave card 301 on the drum 304. A signal passes through either the "and" network 404 or the "and" network 406 in each position during the duplicating process since there is an indication of either "1" or "0" in each position. For this reason, a signal passes through the "or" network 411 to the "and" network 349 in each position during the duplicating operation. These signals prepare the "and" network 349 for the passage of a signal.

A signal from the "or" network 411 can pass through the "and" network 349 only upon the occurrence of a full count in the counter 334. As previously described, this can occur only at the instant that the last position on the card 301 circulating on the drum 304 moves past the heads 310 and 312. In this way, a signal can pass through the "and" network 349 only in the last position of a card on the drum 304 when information is actually being duplicated on the card. This signal passes to the left input terminal of the flip-flop 346 and triggers the flip-flop to its true state as represented by a relatively high voltage on the left output terminal of the flip-flop and a relatively low voltage on the right output terminal of the flip-flop.

When the flip-flop 346 becomes triggered to its true state, the low voltage produced on the right output terminal of the flip-flop is introduced to the counter 348. The counter 348 is preset to a value representing the number of cards which are to be transferred from the stack 300 for the duplication of information from a single card in the stack 12. For example, the counter 348 may be preset to indicate in binary form a decimal value such as "3." This indicates that three successive cards from the output stack 300 are to receive the information on the first card in the stack 12.

The counter 348 may be adapted to operate either on a count-up or count-down basis. When the counter 348 operates on a count-down basis, it may be initially set to a value such as "3." The counter then counts down through successive integers from the value of "3" upon the introduction of successive signals from the right output terminal of the flip-flop 346. A full count is obtained when the counter reaches a value of "0."

When the counter 348 is adapted to operate on a count-up basis, it starts from a value of "0" and counts up through successive integers to a value such as "3" upon the introduction of successive signals from the flip-flop 346. A full count is obtained when a preset value such as "3" is produced in the counter during the operation of the counter 348 on a count-up basis.

The following discussion will proceed on the basis that the counter is counting down from a preset value such as "3" to a full count of "0." When the counter operates in this manner, the first negative signal on the right output terminal of the flip-flop 346 triggers the counter so that the indications in the counter change from a value of "3" to a value of "2." The flip-flops in the counter 348 may be so connected that an output signal is produced from the counter when the binary indications in the counter change from a decimal value of "3" to a decimal value of "2." This signal is introduced to the left input terminal of the flip-flop 350 to trigger the flip-flop to the true state as represented by a relatively high voltage on the left output terminal of the flip-flop.

The relatively high voltage produced on the left output terminal of the flip-flop 350 is introduced through the "or" network 366 to the grid of the tube 368. This high voltage makes the tube 368 conductive and causes current to flow through a circuit including the voltage source 364, the resistance 372, the coil 370 and the tube. The coil 370 becomes energized by the flow of current and acts upon the gate 308 to pivot the gate into a position for obtaining a transfer of the card 301 on the drum 304 to the drum 302 in FIGURE 10. After being transferred to the drum 302, the card continues its movement on the drum until it reaches the output stack 314. The card then becomes transferred to the output stack.

The relatively high voltage produced on the left output terminal of the flip-flop 350 is also introduced through the "or" network 356 to the grid of the tube 358. This voltage causes the tube 358 to become conductive such that current flows through a circuit including the voltage source 364, the resistance 362, the coil 360 and the tube. Upon a flow of current through the coil 360, the coil becomes energized and acts upon the gate 306 to move the gate out of operative relationship with the drum 302. By moving the gate 306 away from the drum 302, the drum is able to act by friction to remove the next card from the input stack 300.

After a particular period of time, the output signal from the counter 348 passes through the delay line 352 and triggers the flip-flop 350 to its "false" state. The resultant relatively low voltage on the left output terminal of the flip-flop 350 causes the tube 368 to become cut off and the coil 370 to become de-energized. When the coil 370 becomes de-energized, the gate 308 returns to its neutral position. At the same time, the tube 358 becomes cut off and the coil 360 becomes de-energized. This causes the gate 306 to return to its position in cooperative relationship with the drum 302 for preventing any further cards 301 from being removed by the drum 302 from the stack 300.

When the second card in the stack 300 becomes transferred to the drum 302, it moves along the drum toward the gate 308. During this time, the output signal from the counter 348 is passing through the delay line 376. At approximately the instant that the card on the drum 302 is approaching the gate 308, the output signal from the counter 348 passes through the delay line 376 to the left input terminal of the flip-flop 378. This signal triggers the flip-flop 378 to produce a relatively high voltage on the left output terminal of the flip-flop.

The high voltage produced on the left output terminal of the flip-flop 378 is introduced through the "or" network 382 to the grid of the tube 384. The high voltage makes the tube 384 conductive and produces a flow of current through a circuit including the voltage source 364, the resistance 388, the coil 386 and the tube. The coil 386 becomes energized upon a flow of current through it and acts upon the gate 308 to pivot the gate into a position for obtaining a transfer of the card on the drum 302 to the drum 304.

After the card has been transferred to the drum 304, the signal from the counter 348 passes through the delay lines 376 and 380 to the right input terminal of the flip-flop 378. The signal triggers the flip-flop 378 to its "false" state for the production of a relatively low voltage on the left output terminal of the flip-flop. This low voltage cuts off the tube 384 such that the coil 386 becomes de-energized. When the coil 386 becomes de-energized, the gate 308 returns to its neutral position and the card transferred to the drum 304 continues to circulate on the drum through one or more revolutions.

When the second card from the stack 300 becomes transferred to the drum 304, it may not be aligned with the card circulating on the drum 20. Certain stages including the "and" network 326, the counter 336, the converter 390, the motor 392 (FIGURE 12) and the differential 396 operate in a manner similar to that described above to adjust the movement of the drum 304 relative to the movement of the drum 20 so that the cards on the drums become aligned.

Upon the alignment of the cards on the drums 20 and 304, the information from the master card 10 on the drum 20 is transferred through certain stages including the "and" networks 404 and 406 and the flip-flop 410 to the slave card 301 on the drum 304. The information transferred to this second slave card from the stack 300 is the same as the information transferred to the first slave card from the stack since the same master card 10 continues to circulate on the drum 20.

At the time that the duplicating operation is completed, a signal passes through the "and" network 349 in a manner similar to that described above and triggers the flip-flop 346 to the "true" state of the flip-flop. The signal from the flip-flop 346 in turn triggers the counter 348 so that the binary indications in the counter change from a decimal value of "2" to a decimal value of "1." This causes an output signal to be produced by the counter for the triggering of the flip-flop 350. The flip-flop 350 operates when triggered to obtain the transfer of the card on the drum 304 to the output stack 314 and to transfer the next card in the input stack 300 to the drum 302.

In like manner, the information on the master card 10 circulating on the drum 20 is duplicated in successive slave cards 301 transferred to the drum 304 from the output stack 300. The information is duplicated on a particular number of cards from the stack 300 in accordance with the initial setting of the counter 348. When the particular number of slave cards 301 from the stack 300 have been duplicated, the counter 348 operates to produce an indication of "0." This causes a signal to pass from the counter 348 to the "and" network 342 to prepare the "and" network for activation.

As previously described, an output signal is produced in the counter 324 when the last position in the master card 10 circulating on the drum 20 is moving past the heads 180 and 182. An output signal is obtained from the counter 324 at this time because of a full count in the counter. The output signal from the counter 324 triggers the flip-flop 338 to its true state as represented by a relatively high voltage on the left output terminal of the flip-flop. The relatively high voltage on the left output terminal of the flip-flop 338 passes through the "and" network 342 when the "and" network becomes prepared for opening at the time that the counter 348 reaches an indication of "0."

The signal from the "and" network 342 passes through the "or" network 420 to the left input terminal of the flip-flop 434 and triggers the flip-flop for the production of a relatively high voltage on the left output terminal of the flip-flop. This voltage is introduced to the grid of the tube 440 to make the tube conductive. The resultant flow of current through the coil 170 and the tube 440 energizes the coil so that the gate 130 becomes pivoted into a position for transferring the master card 10 on the drum 20 to the drum 16. The master card 10 then moves on the drum 20 to the output stack 174.

The signal from the "and" network 342 also passes through the "or" network 420 to the left input terminal of the flip-flop 422. The signal triggers the flip-flop 422 to produce a relatively high voltage on the left output terminal of the flip-flop. This voltage makes the tube 433 conductive and causes current to flow through the coil 102 and the tube 433. The coil 102 becomes energized by his flow of current and acts upon the gate 90 to move it out of cooperative relationship with the drum 16. In this way, the drum 16 is able to withdraw by friction the next card in the stack 12.

At a particular time after the next card in the stack 12 has been transferred to the drum 16, the signal from the "and" network 342 passes through the "or" network 420 and delay line 444 to the left input terminal of the flip-flop 446. The signal triggers the flip-flop 446 to its true state to make the tube 448 conductive. The resultant flow of current through the coil 168 and the tube 448 energizes the coil. By energizing the coil 168, the gate 130 becomes pivoted to a position for transferring the card on the drum 16 to the drum 20. The card continues to circulate on the drum 20 since the gate 130 is returned to its neutral position after the card has been transferred. The gate 130 is returned to its neutral position because of the passage of a signal through the delay line 447 to trigger the flip-flop 446 to its "false" state and cut off the tube 448.

At the same time that the second card 10 from the input stack 12 is transferred to the drum 20 for circulation on the drum, the next card 301 from the stack 300 is transferred to the drum 304. The cards 10 and 301 are then respectively aligned on the drums 20 and 304 in a manner similar to that described above. After the cards 10 and 301 have become aligned, the signal information is duplicated on the card 301. When the duplication has been completed, the card 301 is transferred to the output stack 314 and the next card from the input stack 300 is transferred to the drum 304.

In this way, each card 10 in the input stack 12 has its information transferred to a particular number of cards 301 in the stack 300. The information in each card 10 is duplicated in a particular number of cards 301 since the counter 348 is automatically reset to a particular indication such as the value "3" every time that is becomes set to "0." By such an arrangement, the duplicating operation occurs on an automatic basis until the information in each card 10 in the stack 12 is transferred to cards 301 in the stack 300.

It should be appreciated that the duplication of information from the cards in the stack 12 to the cards in the stack 300 does not have to occur in every position of the cards. Actually, the duplication may occur only at selected positions in accordance with the information programmed into selector stages.

The information also does not have to be transferred from each position of the card 10 circulating on the drum 20 to the corresponding position of the card 301 circulating on the drum 304. For example, the information on the card 10 can be shifted by a particular number of vertical columns when it is transferred to the card 301.

The duplication also does not have to occur on a sequential basis in which the duplication occurs in only one vertical column of the cards at any instant. For example, the duplication can occur on a block basis in which the information in a plurality of vertical columns is transferred from one card to the other at one time. The duplication can occur on a block basis by using a register to store the information in a plurality of vertical columns in the card 10 circulating on the drum 20 and by transferring the information in the register at one instant to the appropriate vertical columns of the card 301 circulating on the drum 304. The register can be made from a plurality of flip-flops in a conventional manner.

The transfer of cards from the input stack 12 to the drums 16 and 20 and from the drums to the output stack 174 can occur manually as by the depression of a push button. In like manner, the transfer of cards from the input stack 300 to the drums 302 and 304 and from the drums to the output stack 314 can occur manually as by the depression of a different push button. Such a manual control over the transfer of cards may be desirable in some instances, especially when the information on each card in the stack 12 is to be duplicated on a different number of cards in the stack 301. It would also be possible to use a register for controlling the number of times that a duplication is made on each successive card from the input stack 12.

There is thus provided apparatus for recording on cards information programmed into the cards from an external source such as a typewriter. Apparatus is also provided for duplicating on slave cards the information appearing in master cards. A novel type of transducing head is also included for minimizing problems resulting from drum eccentricities so as to obtain an optimum transducing action between the head and the cards on the drum.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:
1. In combination for use with a plurality of cards each having a plurality of positions for the transducement of digital information between the cards and an external source, an input stack for retaining the cards, means including a first rotatable drum for receiving cards individually from the input stack and for retaining the cards in fixed position on the drum during the drum rotation, first gate means for providing a transfer of cards at particular times to the first drum from the input stack and for preventing the transfer of cards to the first drum from the input stack at other times, means including a second rotatable drum for retaining cards in fixed position on the drum during the drum rotation, second gate means disposed to provide in one state of operation a transfer of cards from the first drum to the second drum and to provide in a second state of operation a transfer of cards from the second drum to the first drum, means associated with the first and second gate transfer means for providing a transfer of cards from the first drum to the second drum upon a transfer of cards from the input stack to the first drum, means including transducing means disposed in coupled relationship with the second drum for providing a transducement of digital information between the cards and the external source upon the transfer of the cards to the second drum, means including the second gate transfer means for providing a transfer of the cards from the second drum to the first drum upon the completion in the transducing of digital information between the cards and the external source, and an output stack for receiving the cards transferred from the second drum to the first drum.

2. In combination for use with a plurality of cards each having a plurality of positions for the transducement of digital information between the cards and an external source, means including a rotatable drum for holding cards in fixed position on the drum during the drum rotation, an input stack for holding the cards, an output stack for receiving the cards after their transfer to the drum and their movement on the drum, means including electrical circuitry for initially obtaining an individual transfer of cards to the drum from the input stack without interrupting the drum rotation and for subsequently obtaining an individual transfer of cards to the drum from the input stack upon the transfer of cards from the drum to the output stack without interrupting the drum rotation, recording means disposed relative to the drum and in displaced relationship to the external source to record information from the external source on the cards on the drum, means including electrical circuitry and the recording means for providing a circulation of each card with the drum and for obtaining during the circulation of the particular card a recording of information in successive positions on the card in accordance with information from the external source, and means including electrical circuitry for obtaining a transfer of each particular card from the drum to the output stack upon the completion of the recording of information on the card, and means including electrical circuitry for obtaining a transfer of the next card from the input stack to the drum only upon the transfer of the particular card from the drum to the output stack.

3. In combination for use with a plurality of cards each having a plurality of positions for the transducement of digital information between the cards and an external position, means including a rotatable drum for holding cards in fixed position on the drum during the drum rotation, an input stack for transferring the cards in the plurality to the drum, an output stack for receiving the cards transferred to the drum, means including electrical circuitry for initially obtaining a transfer of a card from the input stack to the drum without interrupting the rotation of the drum, means including electrical circuitry for recording signal information in each position on the card in accordance with information supplied from the external source and for circulating the card with the drum during such recording operation, means including electrical circuitry for preparing a successive position on the card for the recording of signal information upon the recording of signal information in the previous position on the card and for maintaining this position in a prepared state during the circulation of the card with the drum and until the actual transfer of information from the external source to the prepared position, and means including electrical circuitry for obtaining a transfer of each card from the drum to the output stack only upon the completion of the recording operation, and means including electrical circuitry for obtaining the transfer of the next card in the input stack to the drum upon the completion of the recording operation for the card previously on the drum.

4. In combination for use with a plurality of master and slave cards each having a plurality of positions for the transfer of information between the master and slave cards, transport means for the cards in the plurality, input station means for the cards in the plurality, output station means for the cards in the plurality, first transducing means disposed relative to the master cards on the transport means for reading information on such cards, second transducing means disposed relative to the slave cards on the transport means for recording information on such cards, means including first electrical circuitry coupled to the first and second transducing means for obtaining an individual transfer of information by the first and second transducing means from the master cards on the transport means to the slave cards on the transport means, means responsive to the transfer of information from the master cards on the transport means to the slave cards on the transport means to obtain a transfer of such cards to the output station means, and means responsive to the recording of information from the master cards on the transport means to the slave cards on the transport means to obtain a transfer of the next master and slave cards in the input station means to the transport means.

5. In combination for use with a plurality of cards each having a plurality of positions for the transducement of digital information between the cards and an external source, means including a first rotatable drum for holding cards in fixed position on the drum during the drum rotation, means including a second rotatable drum for holding cards in fixed position on the drum during the drum rotation, an input stack for holding the cards in the plurality and for transferring the cards to the first drum, an output stack for receiving the cards transferred from the second drum to the first drum, a first gate disposed to provide in one state of operation for an individual transfer of cards from the input stack to the first drum and in a second state of operation to prevent any transfer of cards from the input stack to the first drum, a second gate disposed in a first state of operation to provide for a transfer of cards from the first drum to the second drum for a circulation of the cards with the second drum during the drum rotation and in a second state of operation to provide for a transfer of cards from the second drum to the first drum, means for recording signal indications at selective positions on the cards in accordance with information supplied from the external source, and means for operating on the second gate to dispose the gate in its second state of operation upon the completion of the recording on each particular card for a transfer of the card from the second drum to the first drum and then to the output stack and for operating on the first and second gates to dispose the gates in their first states of operation for a transfer of the next card from the input stack to the first drum and then to the second drum upon the transfer of the particular card to the output stack.

6. In combination for use with a plurality of master and slave cards each having a plurality of positions for the transducement of digital information between the cards, means including a rotatable drum for holding cards in fixed position on the drum during the drum rotation, an input stack for holding the slave cards in the plurality and for obtaining a transfer of the cards to the drum, an output stack for receiving the slave cards transferred to the drum from the input stack, means for providing for the presentation of the master cards in the plurality for the duplication of signal indications on the cards, means for obtaining a transfer of slave cards individually from the input stack to the drum, means for providing for the duplication of the signal indications from the presented master card to the slave card transferred to the drum, means for providing for the transfer of the slave card to the output stack upon the completion of the duplicating operation and for providing a transfer of the next slave card from the input stack to the drum for duplication of the information on the presented master card, and means for controlling the number of the slave cards transferred from the input stack to the drum for the duplication of the information of the presented master card.

7. In combination for use with a first and second plurality of cards each having a plurality of positions for the transducement of digital information between the cards, means including first and second rotatable drums for holding cards in fixed position on the drum during the drum rotation, first and second input stacks for respectively holding the cards in the first and second pluralities for a transfer of the cards to the first and second drums, first and second output stacks for respectively receiving the cards transferred to the drums from the input stacks, means for respectively obtaining a transfer of cards from the first and second input stacks to the first and second drums, means for providing a duplication of signal information from the card transferred to the first drum to the card transferred to the second drum, means for providing a transfer of the card on the second drum to the second output stack upon the duplication in the card of the signal information in the card on the first drum and for providing a transfer to the second drum of the next card in the second input stack upon the transfer of the card on the second drum to the second output stack, means for obtaining a circulation of the card with the first drum during the duplication operation and during the drum rotation, and means for respectively obtaining a transfer of the cards on the first and second drums to the first and second output stacks upon the duplication of the signal information from the card on the first drum to a particular number of cards transferred to the second drum from the output stack.

8. In combination for use with first and second pluralities of cards each having a plurality of positions for the transducement of digital information between the cards, means including first and second rotatable drums for holding cards in fixed position on the drums during the drum rotations, first and second input stacks for respectively holding the cards in the first and second pluralities for a transfer of the cards to the first and second drums, first and second output stacks for respectively receiving the cards transferred to the first and second drums from the input stacks, means including electrical circuitry for initially obtaining a transfer of cards in the first and second pluralities to the drums, means including electrical circuitry for passing the signal indications in the card transferred to the first drum to selected positions of the card transferred to the second drum for recording in the latter card, means including electrical circutry for obtaining a transfer of the card on the second drum to the second output stack upon the recording of the signal indications in the second card, means including electrical circuitry for obtaining a replacement of each card transferred to the second output stack with the next card from the second input stack for a recording on this next card of the signal indications from the card on the first drum, means including electrical circuitry for counting the number of cards transferred to the second drum for the recording of the signal indications on the card transferred to the first drum, and means including electrical circuitry for respectively obtaining a transfer of the cards on the first and second drums to the first and second output stacks upon the recording of signal indications on a particular number of cards on the second drum and for respectively transferring the next cards in the first and second input stacks to the first and second drums for the duplicating operation.

9. In combination for use with first and second pluralities of cards each having a plurality of positions for the transducement of digital information the cards, means including first and second rotatable drums for holding cards in fixed position on the drums during the drum rotations, first and second input stacks for respectively holding the cards in the first and second pluralities for transfer to the first and second drums, third and fourth rotatable drums respectively disposed in contiguous relationship to the first and second drums, means including the third and fourth drums for holding the cards in fixed position on the drums during the drum rotations, first and second output stacks for respectively receiving the cards transferred to the drums from the first and second input stacks, first and second gates respectively associated with the first input stack and the first drum and with the second input stack and the second drum and operable in first states to obtain a transfer of cards from the input stacks to the drums and operable in second states to prevent a transfer of cards from the input stacks to the drums, third and fourth gates respectively associated with the first and third drums and with the second and fourth drums and operable in first states to respectively obtain a transfer of cards from the first and second drums to the third and fourth drums for circulation with the third and fourth drums during the drum rotations and operable in second states to respectively obtain a transfer of cards from the third and fourth drums to the first and second drums, means including electrical circuitry for providing the first and second gates with the first states of operation of the gates to obtain a transfer of cards from the first and second input stacks to the first and second drums and for providing the third and fourth gates with the first states of operation to obtain a transfer of the cards to the third and fourth drums, means including electrical circuitry for recording signal indications on the cards on the fourth drum at particular positions in accordance with the signal indications on the cards on the third drum, and means including electrical circuitry for initially providing the third and fourth gates with the second states of operation to respectively obtain a transfer of the cards on the third and fourth drums to the cards on the first and second drums and for providing the first and second gates and the third and fourth gates with the proper states of operation to obtain a transfer of the next cards in the first and second stacks to the first and second drums and then to the third and fourth drums.

10. In combination for use with a plurality of cards each having a plurality of positions for storing digital information on the cards in the plurality, a rotatable drum for carrying the cards on its periphery during its rotation, a head constructed to provide a transducing action between the head and the digital positions on the card upon a disposition of the cards in abutting relationship against the head, at least one pawl positioned between the drum and the head and shaped to withdraw the cards from the drum for movement past the head and to return the cards to the drum after the movement of the cards past the head for a transducing action between the head and the digital positions on the cards during the movement of the cards past the head, and means operatively coupled to the cards during the movement of the cards past the head to maintain the cards in abutting relationship against the head during such movement.

11. In combination for use with a plurality of cards each having a plurality of positions for the storage of digital information on the cards, a rotatable drum, means for producing a vacuum effect on the periphery of the drum to retain the cards on the periphery of the drum during the drum movement, a head for providing a transducing action between the digital positions on the cards and the external source, at least one pawl disposed between the periphery of the drum and the head to remove the cards from the drum for movement past the head and to return the cards to the drum after their movement past the head, and means operatively coupled to the drum and to the head for producing a vacuum effect on the periphery of the drum and in the head to retain the cards in fixed position on the periphery of the drum during the drum movement and to obtain a fixed coupling between the head and the cards for an optimum transducing action during the movement of the cards past the head.

12. In combination for use with a plurality of cards each having a plurality of positions for the storage of digital information on the cards, means for producing a vacuum, a rotatable drum, there being a plurality of slots in the periphery of the drum and a plurality of passageways in communication with the vacuum means and the slots to hold the cards in fixed position on the periphery of the drum during the drum rotation, a head for providing a transducing action between the external source and the digital information on the cards moving on the drum, there being passageways in the head in communication with the vacuum means to hold the cards against the heads for an optimum transducing action during the movement of the cards past the heads, and at least one pawl extending at extreme positions into the slots in the drum and extending at intermediate positions to a contiguous relationship to the head to remove the cards from the drum for movement past the head and for subsequent transfer of the cards back to the head.

13. In combination for use with a plurality of cards each having a plurality of positions for the transducement of digital information between the cards and an external source, means including transport means movable in a closed loop for receiving cards and for providing a movement of the cards in accordance with the movement of the transport means, an input stack for holding the cards, means including first gate transfer means disposed in coupled relationship to the transport means for obtaining a controlled transfer of cards from the input stack to the transport means without interrupting the movement of the transport means, electrical circuitry including transducing means disposed relative to the transport means and in electrically coupled relationship to the external source for providing a transducement of digital information between the cards and the external source, an output stack for receiving cards from the transport means, means including second gate transfer means disposed in coupled relationship to the transport means for obtaining a controlled transfer of cards from the transport means to the output stack without interrupting the movement of the transport means, electrical circuitry including the transducing means for operating upon the second gate transfer means upon the transducement of digital information between the cards and the external source to obtain a transfer of the cards from the transport means to the output stack, and electrical circuitry including the transducing means for operating upon the first gate means upon such transducement to obtain the transfer of the next cards in the input stack to the transport means.

14. In combination for use with a plurality of cards each having a plurality of positions for the transducement of information between the cards and an external source, means including transport means movable in a closed loop for receiving cards and for providing a movement of the cards in accordance with the movement of the transport means, an input stack for holding cards for transfer to the transport means, an output stack for receiving cards from the transport means, first gate means for obtaining a controlled transfer of cards from the input stack to the transport means without interrupting the movement of the transport means, second gate means for obtaining a controlled transfer of cards from the transport means to the output stack without interrupting the movement of the transport means, transducing means disposed in coupled relationship to the transport means, means including a first plurality of logical "and" networks and bistable members and including the transducing means for activating different positions on each card in a preselected pattern upon the movement of the card with the transport means past the transducing means, means including a second plurality of logical "and" networks and bistable members and including the transducing means for providing a transducement of signal information between the external source and the card on the transport means at the activated positions, means including a third plurality of logical "and" networks and bistable members and including the transducing means for providing an indication as to the completion of the transducing action on each card moving with the transport means, means including a fourth plurality of logical "and" networks and bistable members and including the first gate means for obtaining a transfer of the next card in the input stack to the transport means upon the completion of the transducing action on each card moving with the transport means, means including a fifth plurality of logical "and" networks and bistable members and including the second gate means for obtaining a transfer of each card to the output stack from the transport means upon the completion of the transducing action on the card, and means including a counter for obtaining a transducement of signal information between the external source and a preselected number of cards in the input stack.

15. In combination for use with a plurality of cards each having a plurality of positions for the transducement of digital information between the cards and an external source capable of providing digital information in any selected pattern, means including transport means for the cards, an input stack for holding the cards, means including gate means disposed in coupled relationship to the input stack and the transport means for providing a controlled transfer of cards from the input stack to the transport means, means operative upon the transported cards for preparing selected positions on the cards for the transducement of information during the movement of the cards, means coupled to the last mentioned means for providing for the transfer of digital information from the external source to the selected positions on the cards upon the selection and activation of digital information at the external source and in accordance with the activation of such information and for providing for the recording of the digital information at such positions, means responsive to the transfer means for preparing successive positions on the cards for the transfer of information from the external source upon the recording of digital information at the selected positions on the cards, an output stack for holding cards, and means including gate means disposed in coupled relationship to the transport means and the output stack for providing a controlled transfer of cards from the transport means to the output stack upon the completion of the transfer of digital information from the external source to the cards.

16. The combination as set forth in claim 15 in which the external source is a typewriter having a plurality of keys and in which means including electrical circuitry are provided for recording digital information at the selected positions on the cards in accordance with the actuation of the particular typewriter keys.

17. In combination for use with a plurality of master and slave cards each having a plurality of positions for the transducement of digital information between the master and slave cards, means including first and second transport means for the cards, first and second transducing means respectively disposed relative to the cards on the first and second transport means to provide a transducing action with the information on the cards, first and second input stacks for respectively holding the master and slave cards, means including first and second retaining means disposed in coupled relationship to the input stacks for respectively providing a controlled transfer of cards from the first and second input stacks to the first and second transport means, and means including the first and second transducing means and including electrical circuitry coupled to the first and second transducing means for providing a transfer of the signal information at selected positions on the transported master cards to selected positions on the transported slave cards.

18. In combination for use with a plurality of master and slave cards each having a plurality of positions for the transducement of digital information between the cards, means including first and second transport means for the cards, first and second transducing means respectively disposed relative to the cards on the first and second transport means to provide a transducing action with the information on such cards, first and second input stacks for respectively holding the master and slave cards, means disposed in coupled relationship to the transport means and the input stacks for obtaining a controlled transfer of cards from the first and second input stacks to the first and second transport means, means including the first and second transducing means for determining the relative spacing at a particular instant between the first transducing means and a particular position on the transported master cards and between the second transducing means and the corresponding position on the transported slave cards, means coupled to the last mentioned means for synchronizing the operation of the first and second transducing means at corresponding positions of the transported master and slave cards in accordance with the determinations of the differences in the relative positions of the cards by the last mentioned means, and means coupled to the synchronizing means and including the transducing means for providing a transfer of signal information from the transported master cards to the transported slave cards upon the synchronization in the operation of the first and second transducing means.

19. In combination for use with a plurality of master and slave cards each having a plurality of positions for the transducement of digital information between the cards, means including first and second transport means constructed to obtain a movement of the cards and disposed in spaced relationship to each other, first and second input stacks for respectively holding the master and slave cards, means disposed in coupled relationship to the transport means and to the input stacks for respectively obtaining a controlled transfer of the master and slave cards to the first and second transport means, means including first and second transducing means respectively disposed relative to the first and second transport means and including circuitry electrically coupled to the first and second transducing means for providing a transfer of digital information from the transported master cards to the transported slave cards, first and second output stacks for respectively holding the master and slave cards, and means disposed in coupled relationship to the transport means and to the output stacks for respectively obtaining a transfer of the master and slave cards from the first and second transport means to the first and second output stacks upon the transfer of the digital information from the master to the slave cards.

20. In combination for use with a plurality of master and slave cards each having a plurality of positions for the transducement of digital information between the cards, transport means for the slave cards, an input stack for holding the slave cards, means including gate means coupled to the transport means and to the input stack for providing a controlled transfer of slave cards from the input stack to the transport means, means operatively coupled to the master cards for sequentially presenting the master cards for the transfer of digital information from the master cards, means responsive to the presenting of the master cards for activating successive positions on the master cards for the transfer of the digital information to the slave cards, means including transducing means disposed relative to the cards on the transport means for recording on the slave cards the digital information at selected positions on the master cards, an output stack for holding the slave cards, and means including gate means disposed in coupled relationship to the transport means and the output stack for providing a controlled transfer of the slave cards from the transport means to the output stack upon the recording of the digital information at the selected positions of the cards.

21. In combination for use with a plurality of master and slave cards each having a plurality of positions for the transducement of digital information between the cards, transport means for the slave cards, an input stack for holding the slave cards, means including gate means disposed in coupled relationship to the transport means and the input stack for providing a controlled transfer of slave cards from the input stack to the transport means in the order of the disposition of the cards in the input stack, means for sequentially presenting each master card in the plurality for the transfer of digital information on the cards and for sequentially preparing each position on the card for the transfer of digital information to the slave cards, transducing means disposed relative to the cards on the transport means to provide a transducing action, electrical circuitry including the transducing means for recording in each transported slave card the digital information at particular positions on the presented master card as such positions become prepared for the transfer of information, electrical circuitry including the transducing means for counting the successive cards having digital information recorded from the presented master card, an output stack for receiving the slave cards, means including gate means disposed relative to the transport means and the output stack for obtaining a controlled transfer of the transported slave cards to the output stack after the recording of the signal information on the cards, and means for presenting the next master card for the transfer of digital information from that card to the next slave cards in the input stack upon the transfer of the digital information from the previous master card to a particular number of slave cards as indicated by the counting means.

22. In combination for use with a plurality of cards each having a plurality of positions for the storage of digital information on the cards, means including transport means for the cards and constructed to maintain the cards on the transport means during the movement of the cards, a head disposed relative to the cards on the transport means to provide a transducing action between the cards and the external source, means including at least one guide member disposed in coupled relationship to the cards on the transport means and shaped to lift the cards from the transport means for movement past the head and back to the transport means, and means operative upon the cards during the movement of the cards past the head for pressing the cards against the head during the movement of the cards past the head to obtain an optimum coupling between the cards and the head for the transducing of the digital information by the head.

23. In combination for use with a plurality of cards each having a plurality of positions for the storage of digital information on the cards, means including transport means for the cards and constructed to maintain the cards on the transport means during the movement of the cards, a head disposed near the transport means to provide a transducing action between the digital positions on the card and the external source, means operative upon the transported cards for producing a movement of the cards from the transport means past the head and then back to the transport means after movement past the head, and means operative upon the transported cards during their movement past the head for imposing a fluid force on the cards to maintain the cards in contiguous relationship to the head during the movement of the cards past the head to obtain a transducing action by the head.

24. In combination for use with a card having a plurality of digital positions for the transfer of digital information between the card and an external source, the combination of: means including a transport member constructed to obtain a movement of the card on a repetitive basis through a plurality of loops each having a path similar to that of the other loops, means including gate means coupled to the card and disposed relative to the transport member to obtain a transfer of the card to the transport member, transducing means disposed relative to the different positions in the plurality on the card during the movement of the card past the transducing means, first electrical circuitry coupled to the transducing means and responsive to the different positions on the card during each movement of the card past the transducing means to obtain a transfer of information between the external source and particular positions in the plurality on the card, means including the transducing means and including second electrical circuitry coupled to the first electrical circuitry and to the transducing means for obtaining at each instant an activation of particular positions in the plurality on the card dependent upon the positions previously activated on the card, means including third electrical circuitry coupled to the first and second electrical circuitry for obtaining an activation of progressive positions in the plurality on the card upon each transfer of information between the external source and the positions in the plurality previously activated on the card, and means including the gate means and responsive to the transfer of information between the external source and the progressive positions in the plurality on the card for obtaining a transfer of the card from the transport member.

25. In combination for use with a card having a plurality of digital positions for the transfer of digital information between the card and an external source, the combination of: means including a transport member constructed to obtain a continuous movement of the card through a plurality of cyclic movements, transducing means disposed relative to the card in the successive cyclic movements of the card to obtain a transfer of information between the external source and the different positions in the plurality on the card, means including first electrical circuitry coupled to the transducing means to obtain a transfer of information between the external source and only the particular positions on the card at each instant, and means including second electrical circuitry responsive to each recording of information on the card in the particular positions of the card and coupled to the first electrical circuitry for obtaining an advance in the particular positions on the card to progressive positions in the plurality on the card.

26. In combination for use with a plurality of cards each having a plurality of positions for the transfer of digital information between the cards and a source external to the cards, transport means for the cards, transducing means disposed relative to the cards on the transport means for obtaining a transfer of information between the positions in the plurality on the card and the external source, means including electrical circuitry coupled to the transducing means for sequentially activating progressive positions on the cards on the transport means to obtain a transfer of information between the external source and the activated positions on the cards and to obtain a progressive advance of the activated positions on the card upon each such transfer of information between the external source and the activated positions on the card, an input station for the cards in the plurality, an output station for the cards in the plurality, means responsive to the transfer of information between the external source and the different positions on each card on the transport means for obtaining a transfer of that card from the transport means to the output station, and means responsive to the transfer of information between the external source and the different positions on each card on the transport means for obtaining a transfer of the next card in the input station to the transport means.

27. In apparatus for use with a card having a plurality of positions for the transfer of digital information between the card and a source external to the card, transport means constructed to obtain a movement of each card on the transport means in a repetitive pattern with each repetitive pattern constituting a closed loop, transducing means disposed relative to each card on the transport means to obtain a transfer of information between the external source and the positions in the plurality on the card, first means for obtaining an activation of particular positions on the card during each movement of the card past the transducing means, second means coupled to the transducing means for individually indicating the different positions on the card during the movement of the card past the transducing means, means responsive to the indications of the first and second means and coupled to the transducing means and to the external source for obtaining a transfer of information between the external source and the activated positions on the card, and means responsive to each transfer of information between the external source and the activated positions on the card and coupled to the first means for obtaining a progression in the activated positions on the card.

28. In apparatus for use with a card having a plurality of positions for the transfer of digital information between the card and a source external to the card, transport means movable in a closed loop and constructed to retain the card on the periphery of the transport means and to obtain a movement of the card with the transport means, a first counter constructed to indicate at each instant the particular positions to be activated on the card during each movement of the card in the closed loop, transducing means disposed relative to the card on the transport means to obtain a transfer of information between the external source and the activated positions on the card during each movement of the card past the transducing means, means including a second counter coupled to the transducing means to indicate the positions coupled on the card to the transducing means during each movement of the card past the transducing means, means including first electrical circuitry responsive to the indications produced by the first and second counters to obtain a transfer of information between the external source and the activated positions on the card upon the occurrence of a particular relationship between the counts in the first and second counters, and means including second electrical circuitry responsive to each transfer of information between the external source and the activated positions on the card to obtain an advance of the first counter for a progressive activation of the different positions on the card.

29. In combination for use with a plurality of master and slave cards each having a plurality of positions for the transfer of information between the master and slave cards, first transport means for the master cards, second transport means for the slave cards, first and second stations each constructed to hold the master cards in a stacked relationship, third and fourth stations each constructed to hold the slave cards in a stacked relationship, first and second transducing means respectively disposed relative to the cards on the first and second transport means to obtain a transducing action between the production of electrical signals and the reading and recording of information on the transported cards, means including first electrical circuitry coupled to the first and second transducing means for obtaining a transfer of information from the master card on the first transport means to the slave card on the second transport means, means including second electrical circuitry responsive to the recording of information on each slave card on the second transport means to obtain a transfer of the slave card from the transport means to the fourth station and to obtain a transfer of the next slave card in the second station to the second transport means, and means including third electrical circuitry responsive to the recording of information from each master card on the first transport means to a particular number of slave cards on the second transport means to obtain a transfer of the master card into the first input station and to obtain a transfer of the next card in the first station to the first transport means.

30. In combination for use with a master card and a slave card each having a plurality of positions for the transfer of information between the master and slave cards, first transport means operative to obtain a movement of the master card, second transport means operative to obtain a movement of the slave card, means coupled to the second transport means to adjust the movement of the slave card relative to the movement of the master card for an adjustment in the relative dispositions of the master and slave cards on the first and second transport means, first transducer means disposed relative to the master card on the first transport means to sense the information in the different positions on the card, second transducer means disposed relative to the slave card on the second transducer means to sense the different positions on the slave card and to transfer information to the different positions on the slave card, and means responsive to the signals sensed by the first and second transducer means to control the operation of the adjusting means in a direction to obtain a simultaneous movement of the cards past the first and second transducer means.

31. The combination set forth in claim 30 in which means are coupled to the first and second transducer means to obtain a transfer of information from the first transducer means to the second transducer means upon a simultaneous movement of the master and slave cards past the first and second transducer means.

32. In combination for use with a master card and a slave card each having a plurality of positions for the transfer of information between the master and slave cards, first transport means operative to obtain a movement of the master card, second transport means operative to obtain a movement of the slave card, first transducing means disposed relative to the master card on the first transport means to sense the information in the different positions in the plurality on the card, second transducing means disposed relative to the slave card on the second transport means to sense the different positions on the slave card and to record information in the different positions in the plurality on the slave card, means including first electrical circuitry responsive to the signals sensed by the first and second transducing means for sensing differences in the positioning of the master card on the first transport means relative to the positioning of the slave card on the second transport means, means including second electrical circuitry coupled to the first electrical circuitry for providing a compensation between the differences in positioning of the master card on the first transport means relative to the slave card on the second transport means, and means including third electrical circuitry coupled to the first electrical circuitry for obtaining a transfer of information from the master card to the slave card upon the compensation in the differences in positioning between the master and slave cards.

33. In combination for use with a plurality of master and slave cards each having a plurality of positions for the transfer of information between the master and slave cards, a first input station constructed to hold the master cards in a stacked relationship, a second input station constructed to hold the slave cards in a stacked relationship, a first output station constructed to hold the master cards in a stacked relationship, a second output station constructed to hold the slave cards in a stacked relationship, first transport means for the master cards, the first transport means being disposed relative to the first input and output stations to obtain a transfer of cards from the first input station and to obtain a movement of such cards to the first output station for transfer into the first output station, second transport means for the slave cards, second transport means being disposed relative to the second input and output stations to obtain a transfer of cards from the second input station and to obtain a movement of such cards to the second output station for transfer into the second output station, means operative to obtain an individual transfer of the master cards in sequence from the first input station to the first transport means, means operative to obtain an individual transfer of the slave cards in sequence from the second input station to the second transport means, means operative to obtain a transfer of information from each master card to a particular group of successive slave cards transferred to the second transport means from the second input station, means operative to obtain a transfer of each slave card in each particular group from the second transport means to the second output station upon the transfer of information to such slave card from the master card on the first transport means, and means operative to obtain a transfer of each master card from the first transport means to the first output station upon the transfer of information from that master card to the particular group of slave cards.

34. In combination for use with a plurality of master and slave cards each having a plurality of positions for the transfer of information between the master and slave cards, first transport means for the master cards, second transport means for the slave cards, first means coupled to the first transport means for obtaining an individual transfer of the master cards in the plurality to the first transport means, second means coupled to the second transport means for obtaining an individual transfer of the slave cards in the plurality to the second transport means, first transducing means disposed relative to the master cards on the first transport means for reading information on such cards, second transducing means disposed relative to the slave cards on the second transport means for recording information on such cards, means including first electrical circuitry coupled to the first and second transducing means for obtaining a transfer of information by the first and second transducing means individually from the different positions on the master cards on the first transport means to corresponding positions on the slave cards on the second transport means, and means including second electrical circuitry responsive to the recording of information from the master card on the first transport means to the slave cards on the second transport means to obtain a respective transfer of the master and slave cards from the first and second transport means.

35. In combination for use with a plurality of cards each having a plurality of positions for the storage of digital information on the cards, transport means for the cards, means disposed relative to the transport means for lifting the cards from the transport means and for guiding the movement of the cards and for returning the cards to the transport means after such guided movement, a head disposed adjacent the guide means for providing a transducing action with respect to the digital information on the cards, and means operative upon the cards during the movement of the cards past the head for exerting a pneumatic force against the cards to press the cards against the head for an optimum coupling between the cards and the head during the transducing action provided by the head.

36. The combination set forth in claim 35 in which the pneumatic means are disposed to produce a vacuum force at the head for pressing the cards against the head.

References Cited in the file of this patent

UNITED STATES PATENTS

| | | |
|---|---|---|
| 2,033,849 | Mudd | Mar. 10, 1936 |
| 2,253,052 | Schubert et al. | Aug. 19, 1941 |
| 2,524,029 | Carroll et al. | Oct. 3, 1950 |
| 2,752,154 | Nelson | June 26, 1956 |
| 2,792,175 | Amundsen | May 14, 1957 |
| 2,842,362 | Hayes et al. | July 8, 1958 |